United States Patent [19]
Holt et al.

[11] Patent Number: 4,896,626
[45] Date of Patent: Jan. 30, 1990

[54] SHELLFISH CULTURE METHODS AND APPARATUS

[75] Inventors: John K. Holt; David E. Vaughan; Roger L. Creswell, all of Ft. Pierce, Fla.

[73] Assignee: Harbor Branch Oceanographic Institution, Inc., Ft. Pierce, Fla.

[21] Appl. No.: 235,516

[22] Filed: Aug. 24, 1988

[51] Int. Cl.⁴ ............................................. A01K 61/00
[52] U.S. Cl. ............................................. 119/4; 119/2
[58] Field of Search .................................... 119/2, 3, 4

[56] References Cited

U.S. PATENT DOCUMENTS

| | | | |
|---|---|---|---|
| 2,989,945 | 6/1961 | Ford | 119/4 |
| 3,017,356 | 1/1962 | Munz | 119/4 |
| 3,811,411 | 5/1974 | Moeller | 119/4 |
| 3,909,971 | 10/1975 | Wilde | 119/4 |
| 4,328,764 | 5/1982 | Nickel | 119/4 |
| 4,434,743 | 3/1984 | Nickel | 119/4 |

FOREIGN PATENT DOCUMENTS

| | | | |
|---|---|---|---|
| 2702705 | 7/1977 | Fed. Rep. of Germany | 119/4 |
| 2407665 | 7/1979 | France | 119/4 |
| 2513851 | 4/1983 | France | 119/4 |
| 2577106 | 8/1986 | France | 119/2 |
| 2590765 | 6/1987 | France | 119/2 |
| 2607358 | 6/1988 | France | 119/2 |

Primary Examiner—Paul J. Hirsch
Attorney, Agent, or Firm—Carroll F. Palmer

[57] ABSTRACT

Apparatus for the cultchless cultivation of marine bivalve mollusks, e.g., oysters and clams, has a plurality of quadilrateral compartments connected together by a pair of longitudinal cords in the form of a continuous belt. In use of the apparatus, spat is placed in the culture chambers of the belt which then is immersed in an aquaculture plot and the spat is allowed to grow in such chambers. Later, portions of the belt are lifted out of the water while allowing the remainder of the belt to remain immersed and compartments in the withdrawn portion of the belt are cleaned and/or opened to process mollusks contained therein.

13 Claims, 2 Drawing Sheets

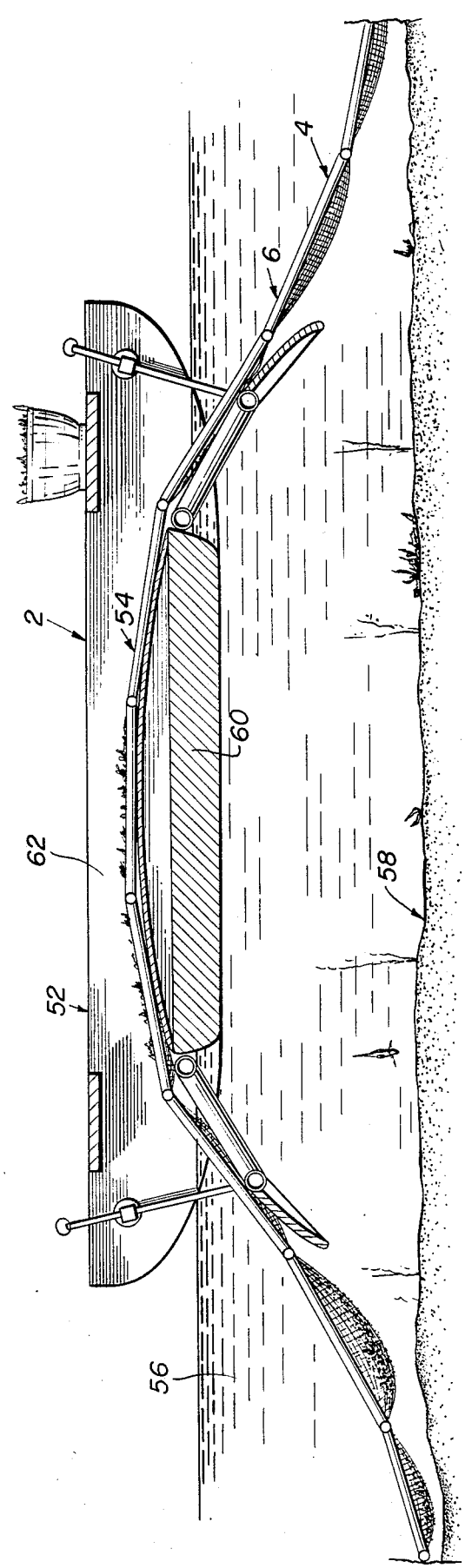

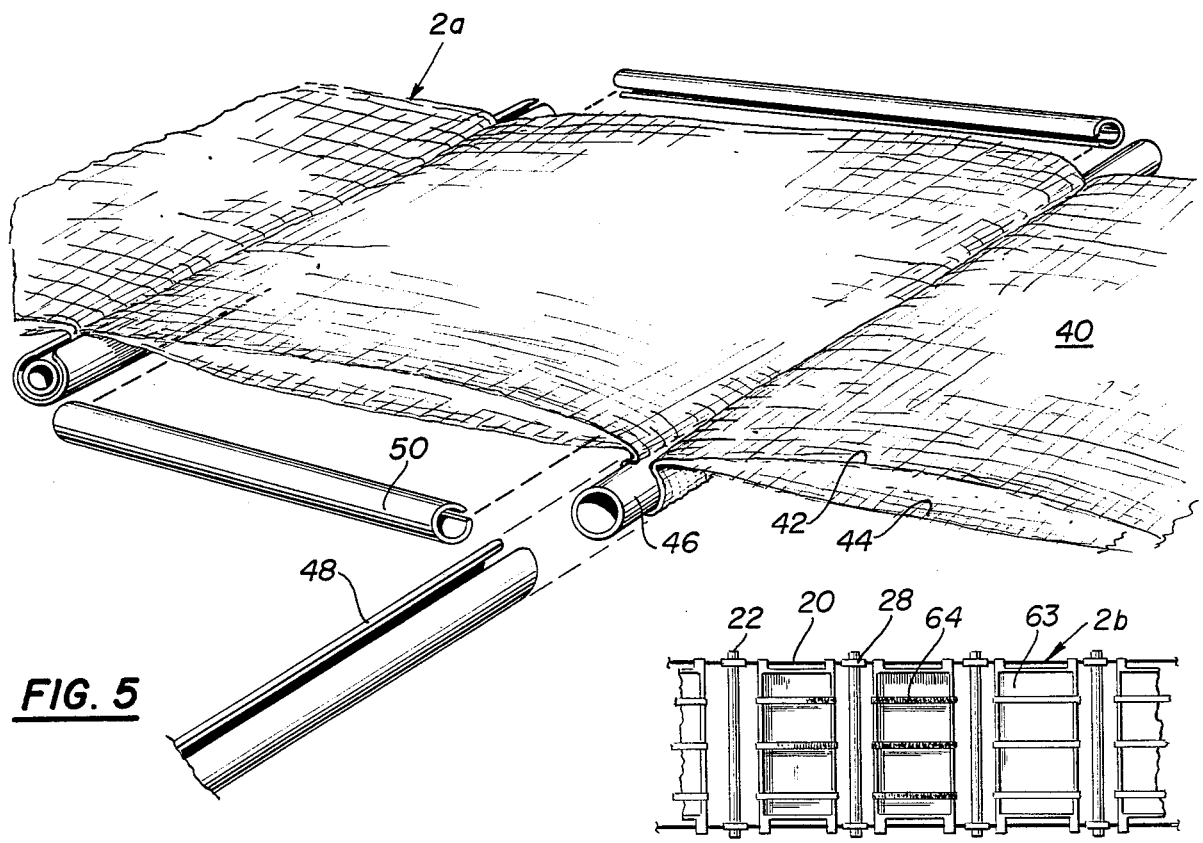
FIG. 5
FIG. 6
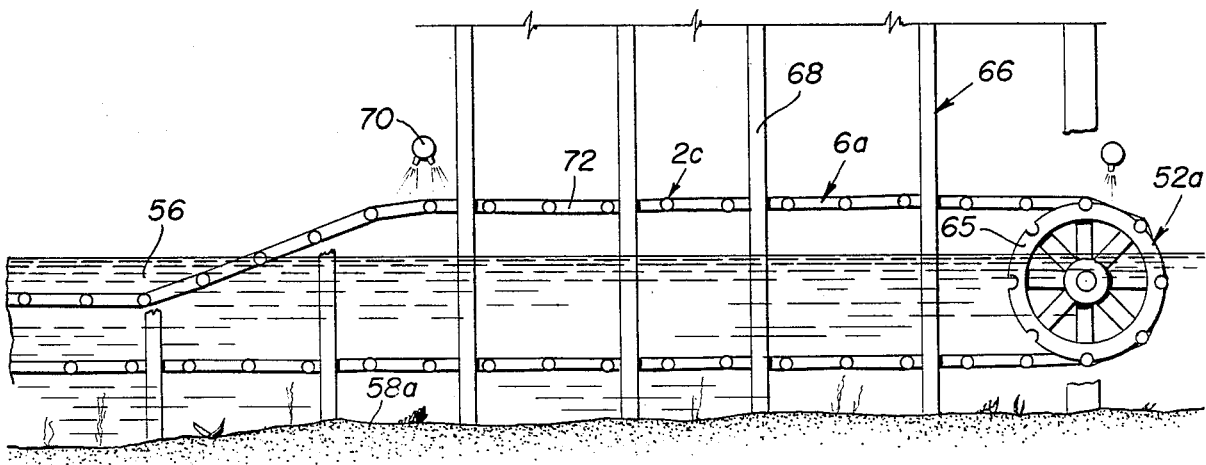
FIG. 7

SHELLFISH CULTURE METHODS AND APPARATUS

FIELD OF THE INVENTION

This application relates to methods and apparatus for the cultchless cultivation of marine bivalve mollusks. More particularly, it concerns methods for cultivation of juvenile mollusks (spat) under protected conditions to greatly increase the yield of adult mollusks per unit area of cultivation and personnel time spent in the cultivation.

BACKGROUND OF THE INVENTION

Historically commercial harvesting of mollusks, e.g., oysters, clams, mussels, etc., has been largely dependent on naturally available cultivation terrain and conditions. Thus, the majority of oysters, clams, etc. are harvested from naturally existing areas in which the mollusks typically exist or are implanted. In other words, commercial harvesters of mollusks have, in large, simply harvested mollusks as they existed in nature or used naturally occurring propagation areas for seeding for subsequently harvesting.

Oysters, clams and similar shellfish undergo complex changes during their initial stages of growth. In order to grow an economically significant proportion of a crop of spat to marketable size, two things are of basic importance, i.e., availability of food and protection from predators.

A land-based hatchery/nursery provides protection, but must also provide food for the early, most vulnerable stages of the shellfish. As the juveniles grow, they require more food so a condition of economic impracticality is reached. In many natural situations, the algae utilized as food is abundant, but predators also are abundant. Enclosures may be used as protection against predators, but fouling organisms grow rapidly under such conditions so the enclosures must be cleaned at regular intervals to insure adequate water circulation through the enclosures.

As most mollusks are bottom dwelling creatures, conventional enclosures are bottom oriented, e.g., cages, and have been labor intensive as regards cleaning and sorting. Culture systems, such as oriental string culture for oysters, may be considered exceptions, but are nevertheless labor intensive.

It has long been recognized that the "natural" form of mollusk cultivation and harvesting is highly inefficient for many reasons, e.g., the attack of predators on the spat. Hence, considerable work has been done to try to render the cultivation and harvesting of mollusks a more efficient operation as shown by U.S. Pat. Nos.:

| | |
|---|---|
| 2,922,393 | 3,811,411 |
| 3,017,856 | 3,909,971 |
| 3,017,857 | 4,328,764 |
| 3,678,900 | 4,434,743. |
| 3,766,888 | |

This present invention provides new apparatus and methods that permit the cultivation and harvesting of mollusks to be much improved over prior methods and apparatus with the result that greatly improved quantities of marketable mollusks can be harvested for each unit of aquaculture area and unit amount of personnel time expended thereon as compared to what could be obtained prior to this invention.

OBJECTS

A principal object of this invention is the provision of new methods and apparatus for the cultchless cultivation of marine bivalve mollusks.

Further objects include the provision of:

1. New methods for cultivation of juvenile mollusks (spat) under protected conditions to greatly increase the yield of adult mollusks per unit area of cultivation and personnel time spent in the cultivation.

2. New apparatus for the cultchless cultivation of oysters and clams for deployment in water conditions conducive to rapid growth of the shellfish and protect them from predators.

3. Such apparatus that is easily cleaned and capable of handling the crop of mollusks on a routine basis with low labor requirements and minimum exposure of workers to adverse weather conditions.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention, in part, by the provision of apparatus for the cultchless cultivation of marine bivalve mollusks that comprises a plurality of individual quadrilateral, compartments connected together in the form of a continuous belt, each compartment formed by an upper and a lower section of mesh fabric defined by substantially parallel longitudinal edges and substantially parallel transverse edges with the sections being held together only at the longitudinal and transverse edges thereof leaving the remainder of the sections unconnected defining therebetween a mollusk culture chamber. Such apparatus further includes means to tether the belt in an aquaculture plot.

In a preferred embodiment, the new apparatus comprises a first elongated strip of mesh fabric having substantially parallel elongated longitudinal edges and a second elongated strip of mesh fabric substantially identical in shape to and aligned face to face with the first strip. There are a plurality of tubes slightly longer than the width of the strips spaced apart along and normal to the longitudinal axes of the strips so that the ends of the tubes extend beyond the longitudinal edges of the strips and the strips are clamped around the tubes by first C-shaped tubular members while second C-shaped tubular members clamp the longitudinal edges of the strips together between the tubes.

The objects are further accomplished by the provision of means to lift limited size portions of the belts of the invention out of the water in the aquaculture plot in which their are positioned while leaving the remainder of the belt immersed in the water. In a first embodiment such means comprises a floating platform and the platform forms part of a person transport vessel. In a second embodiment, such means comprises a power driven cylinder rotating about an horizontal axis positioned so that a portion of the cylinder projects above the level of the water. Advantageously, the cylinder is a portion of a structure mounted on pilings in the aquaculture plot.

The objects are further accomplished by the provision of new methods for the cultchless cultivation of marine bivalve mollusks that comprise the steps of (a) providing a plurality of individual quadrilateral compartments connected together in the form of a continuous belt, each compartment formed by an upper and a lower section of mesh fabric defined by substantially parallel longitudinal edges and substantially parallel transverse edges, the sections being held together only at the longitudinal and transverse edges thereof leaving the remainder of the sections unconnected defining therebetween a mollusk culture chamber, (b) placing juvenile mollusk in the culture chambers of the belt, (c) immersing the belt in an aquaculture plot, (d) allowing the juvenile mollusk to grow in the chambers, (d) withdrawing portions of the belt out of the water at the aquaculture plot while allowing the remainder of the belt to remain immersed in the water, and (e) opening the compartments in the withdrawn portion of the belt to process mollusks contained in the compartments.

In a first embodiment, withdrawing portions of the belt out of the water is accomplished by the use of a floating platform. In a second embodiment, withdrawing portions of the belt out of the water is accomplished by passing the belt over a cylinder partially immersed in the water in the aquaculture plot.

BRIEF DESCRIPTION OF THE DRAWINGS

A more complete understanding of the invention may be obtained by reference to the accompanying drawings in which:

FIG. 1 is a lateral view, partially in section, of mollusk cultivation apparatus of the invention.

FIG. 2 is a fragmentary, isometric view of a shellfish cultivation belt constructed in accordance with the invention.

FIG. 3 is a fragmentary, sectional view taken on the line III—III of FIG. 2.

FIG. 4 is a fragmentary, isometric view of a modified arrangement for connecting tubular cross members to support cords in cultivation belts of the invention.

FIG. 5 is a fragmentary, isometric view showing a cultivation belt of the invention partially assembled.

FIG. 6 is a fragmentary, plan view of another embodiment of cultivation belt of the invention.

FIG. 7 is a lateral view of a second embodiment of apparatus constructed in accordance with the invention.

DESCRIPTION OF THE PREFERRED EMBODIMENTS

Apparatus 2 of the invention comprises a plurality of individual quadrilateral, compartments 4 connected together in the form of a continuous belt 6 and means 8 to tether the belt in an aquaculture plot.

Each compartment 4 is formed of an upper section 10 and a lower section 12 of mesh fabric defined by substantially parallel longitudinal edges 14 and substantially parallel transverse edges 16. The sections 10 & 12 are held together only at the longitudinal and transverse edges 14 & 16 thereof leaving the remainder of the sections unconnected defining therebetween mollusk culture chambers 18.

The embodiment of the apparatus shown in FIG. 2, includes a pair of elongated cords 20 and a plurality of tubular members 22 spaced apart along and normal to the longitudinal axes of the cords 20 holding the cords spaced apart and substantially parallel to each other.

Rectangular sections of mesh fabric 24 are clamped by C-shaped tubular clamps 26 at their the longitudinal edges 14 to the cords 20 and have their transverse edges 16 closed. In preferred embodiments, the sections of fabric 24 are cut from a continuous tube of mesh fabric of suitable diameter so that each section is a cylinder and it is the open ends of these cylindrical sections that are clamped shut with clamps 26 as shown in FIG. 3.

The tubular members 22 have a small section of tubing 28 with a ID slightly larger than the diameter of the cord 20 fixed thereto transversely at each end to serve as guideways for the cords 20.

In order to permit the tubular members 22 to be removed from the cords 20 at any time and at any point along the cords, the modified mounting system shown in FIG. 4 has been developed. In this, the tubular member 22a has fixed to its ends 23 an arcuate element 28a, e.g., a piece of plastic tubing with a small longitudinal section cut away forming a slot 29 through which a cord 20 may be placed. When the cord is in position (not shown), another arcuate element 28b is inserted into the element 28a to block the slot 29 and retain the cord in the element 28a. To remove the member 22a from the cord 20, one needs only to slip the element 28b out of element 28a to enable the cord 20 to exit through the slot 29.

In the embodiment of FIG. 2, the means 8 to tether the belt 6 consists of a bridle 30 formed by splicing the ends 32 of the cords 20 at an end of the belt 6 to a single line 33. A spacer member 34 positioned between the splice 36 and the end of the belt 6 holds the cords 20 spaced apart.

The embodiment of the apparatus 2a shown in FIG. 5, has a first elongated strip 40 of mesh fabric having substantially parallel elongated longitudinal edges 42 and a second elongated strip 44 of mesh fabric substantially identical in shape to and aligned face to face with the first strip 40.

A plurality of tubes 46 slightly longer than the width of the strips 40 & 44 are spaced apart along and normal to the longitudinal axes of the strips so that the ends of the tubes 46 extend beyond the longitudinal edges of the strips.

The strips 40 & 44 are clamped around the tubes 46 by first C-shaped tubular members 48, and second C-shaped tubular members 50 clamp the longitudinal edges 42 of the strips 40 & 44 together between the tubes 46.

The cross-bar type construction used in belt 2a not only divides the belt into separate compartments, but elevates it off the bottom of a aquaculture plot to provide good water circulation. The side closures 50 provide support with enough rigidity to maintain the elevation, provide sufficient flexibility for handling the structure as a belt and provide easy access to the internal chamber for exchange of animals or final harvest. Further, in other applications, the tubes 46 provide support for the belt 2a when it is deployed on rails or other supports above the bottom of the aquaculture plot.

To provide a surface cultivation embodiment of the belt 2a, the ends of the tube 46 may be capped to provide flotation for the belt.

The apparatus 2 comprises means 52 to lift limited size portions 54 of the belt 6 out of the water 56 in the aquaculture plot 58 while leaving the remainder of the belt 6 immersed in the water. The means 52 comprises a floating platform 60 that forms part of a person transport Vessel 62.

FIG. 6 illustrates another embodiment of a cultivation belt 2b of the invention used for growing of very small shellfish. This belt comprises longitudinal cords 20 to which are attached trays 63, made of metal or plastic, having elastic cords 64 to hold mesh bags (not shown) in the trays. In this form of belt 2b, the spat are enclosed in mesh bags of very close mesh which are then placed on the trays 63 under the elastic cords 64. With the belt 2b immersed in seawater, the spat can grow to larger size to be transferred to belts such as 2 or 2a for further cultivation.

In the embodiment of the apparatus 2c of FIG. 7, the means 52a to lift the belt 6a comprises a power driven cylinder 65 that rotates about an horizontal axis positioned so that a portion of the cylinder projects above the level of the water. Typically, the cylinder 65 is mounted in a structure 66 situated on pilings 68 in the aquaculture plot 58a. The structure 66 may include spray devices 70 for use in cleaning the portion 72 of the belt 6a lifted out of the water 56 by the means 52a.

Using apparatus of the invention, a method for the cultchless cultivation of marine bivalve mollusks comprises placing juvenile mollusk in the culture chambers, e.g. chambers 18 of belt 6, immersing the belt in an aquaculture plot 58, allowing the juvenile mollusk to grow in the chambers 18, withdrawing portions 54 of the belt out of the water at the aquaculture plot 58 while allowing the remainder of the belt to remain immersed in the water 56, and opening the chambers 18 in the withdrawn portion of the belt 6 to process mollusks contained in the compartments.

In the embodiment of the invention shown in FIG. 1, withdrawing portions of the belt out of the water is accomplished by the use of the floating platform 60. With a double hulled tender vessel including a platform as shown, the belt 6, tethered at both ends, is easily guided over the deck or platform 60 where it can be quickly cleaned with a hose or spray bar (not shown). At the same time, an exchange of juveniles can be accomplished with a minimum of labor.

In the embodiment shown in FIG. 7, withdrawing portions of the belt out of the water is accomplished by passing the belt over the cylinder means 52a. Such a cultivation system can continuously clean and treat shellfish to maintain growth to a maximum and discourage fouling and predatory organisms. All this can be attained with a minimum of labor and interference from the weather to produce millions of shellfish on a continuous basis.

The embodiments of the invention in which an exclusive property of privilege is claimed are defined as follows:

APPENDIX A

```
#ifndef lint
static char sccsid[] = "@(#)ssvis.c 1.40 (Lucasfilm) 5/20/85";
endif include <ssvis.h>
include <ctype.h>
#include <stdio.h>
include <constants.h> static int VisNewGrid(), VisEndBucket(), VisNewFrame(), VisEndFrame(), VisParam(), VisCamera(), VisFilter(), VisEndGrid() ;
static int CSGNewTree(), CSGResolve() ;

static struct vis_procs VisProcs = { VisNewGrid, VisEndBucket, VisNewFrame, VisEndFrame, VisParam, CSGNewTree, V struct bbox {struct xyz min, max;} ;
struct visiblepoint {
        struct visiblepoint    *next ;
        struct xyz             v[4] ;
        float                  minz, maxz ;
        struct color           color ;
        struct color           trans ;
        struct visflags        flag ;
        float                  glasshackopacity ;
#if CSG
        short                  csgtree ;
        short                  csgnode ;
#endif CSG
} ;

float drand() ;
static float Pi;
static int Minx, Maxx, Miny, Maxy ;
static int Border=1 ;
static float Hither, Yon ;
static int XPerBucket, YPerBucket, PixelsPerBucket, FiltersPerBucket ;
static int SamplesPerBucket ;
static int MaxSamplesPerBucket ;
static int BucketsAcrossScreen ;
static struct pixelrgba *Pixel ;
static struct visiblepoint **Point, *VisFreeList=0 ;
```

```c
static int NVis=0, NVisInUse=0, NVisMaxUsed=0 ;
static int VisMallocSize=(16*1024-64) ;
static int Hit, Miss, Lerp ;

static float    FocalLength = 0 ;
static float    FStop = 0 ;
static float    FocalDistance = 0 ;
float Dofx_a, Dofx_b, Dofy_a, Dofy_b ;
int PinHoleCamera=1 ;

static float    FilterWidth = 2.0 ;
static int      FilterType = 1 ;
static int      BoxFilterFlag = 0 ;
static float boxfilter(x,y) float x,y;
    { return (x>FilterWidth||y>FilterWidth) ? 0 : 1; }
static float gaussianfilter(x,y) float x,y ;
{   float w,d ;
    d=x*x+y*y;
    w=FilterWidth*FilterWidth/4.;
    return (d>w) ? 0 : exp(-d) - exp(-w);
}
static float sinc(r) float r;
    { return (r<.001&&r>-.001) ? cos(2*r)/1 : sin(2*r)/r; }
static float sincfilter(x,y) float x,y ;
    { return sinc(x)*sinc(y); }
static float bessel(r) float r;
    { return (r<.001&&r>-.001) ? 1 : j1(2*r)/r; }
static float besselfilter(x,y) float x,y ;
{   float r ;
    r = sqrt(x*x+y*y);
    return bessel(r);
}
static float bartlettfilter(x,y) float x,y ;
{   float ax,ay,w;
    ax = (x<0) ? -x : x;
    ay = (y<0) ? -y : y;
    w = FilterWidth;
    return (w<ax||w<ay) ? 0 : (w-ax)*(w-ay);
}
#define FILTERNAME 80
#define NFILTERS 5
static char     FilterName[NFILTERS][FILTERNAME] =
                {"box", "Gaussian", "sinc", "Bartlett",
                "Bessel"} ;
static float    (*FilterRoutine[NFILTERS])() =
                {boxfilter, gaussianfilter, sincfilter, bartlettfilter,
                besselfilter};

#define NJITTER 512
static int JitterFlag=1;
static float XJitter[NJITTER], YJitter[NJITTER], TJitter[NJITTER];
static float LXJitter[NJITTER], LYJitter[NJITTER] ;
static struct xy *Location ;
static float *Filter ;
static struct xy *Lens ;
static float MinXJitter=0, MaxXJitter ;
static float MinYJitter=0, MaxYJitter ;
static int NS ;
static int NxGrid=4, NyGrid=4 ;

static struct xy Lens16[16] = {
    0.312500, 0.000000,
    -0.312500, 0.000000,
    0.750000, 0.000000,
    -0.750000, 0.000000,
    0.000000, 0.312500,
    0.000000, -0.312500,
    0.000000, 0.750000,
    0.000000, -0.750000,
    0.625000, 0.375000,
    0.375000, 0.625000,
    -0.625000, 0.375000,
    -0.375000, 0.625000,
    0.625000, -0.375000,
    0.375000, -0.625000,
```

```
        -0.625000, -0.375000,
        -0.375000, -0.625000 } ;

struct vis_procs *VisLoad() {                                           VisLoad
    Pi = 4*atan(1.0);
    return(&VisProcs);
} static int VisCamera(focallength,fstop,focaldistance)                   VisCamera
    float focallength, fstop, focaldistance ;
{

PinHoleCamera = (focallength==0.0) ;
    if (PinHoleCamera) return ;

if (focallength<0.0 || fstop<=0.0 || focaldistance<=0.0) {
        fprintf (stderr, "Invalid arguments to visible surface camera routine:\n") ;
        fprintf (stderr, "\tfocal length    %f\n", focallength) ;
        fprintf (stderr, "\tf stop          %f\n", fstop) ;
        fprintf (stderr, "\tfocal distance  %f\n", focaldistance) ;
    }
    FocalLength = focallength ;
    FStop = fstop ;
    FocalDistance = focaldistance ;
} static int VisCameraSetup()                                             VisCameraSetup
{
    float lensradius ;
    static struct xyz Aeye={0,0,1}, Beye={1,1,1} ;
    struct xy Ascreen, Bscreen ;

/* The perspective transformation from eye space to screen space assumes
 * a pinhole camera located at the origin in eye space, and transforms
 * each point (Xe,Ye,Ze) in eye space to a point (Xs,Ys,Zs) in screen
 * space.  For depth of field, however, different sample points assume
 * pinhole cameras located at different points on the lens.  A point
 * that is at (Xe,Ye,Ze) in eye space of the center of the lens is at
 * (Xel,Yel,Ze) in the eye space of the point (lensx,lensy,0) on the
 * lens, where
 * Xel-Xe = lensx * ( 1 - Ze/focaldistance )
 * Yel-Ye = lensy * ( 1 - Ze/focaldistance )
 * The values of lensx and lensy that we use are express as a fraction
 * of the effective lens radius, so that our formulas are actually
 * Xel-Xe = lensx * lensradius * (1 - Ze/focaldistance)
 * Yel-Ye = lensy * lensradius * (1 - Ze/focaldistance)
 * where
 * lensradius = 0.5 * focallength / fstop
 * We know that the perspective matrix is of the form
 * a 0 0 0
 * 0 b 0 0
 * c d e f
 * g h i 0
 * so that
 * Xs  = (a*Xe  + c*Ze + g ) / (f*Ze)
 * Ys  = (b*Xe  + d*Ze + h ) / (f*Ze)
 * and
 * Xsl = (a*Xel + c*Ze + g ) / (f*Ze)
 * Ysl = (b*Xel + d*Ze + h ) / (f*Ze)
 * giving us
 * Xsl-Xs = (Xel-Xe) * a/(f*Ze)
 *        = lensx * lensradius * (a/f) * (1/Ze - 1/focaldistance)
 *        = lensx * (Dofx_a/Ze + Dofx_b)
 * Ysl-Ys = (Yel-Ye) * b/(f*Ze)
 *        = lensy * lensradius * (b/f) * (1/Ze - 1/focaldistance)
 *        = lensy * (Dofy_a/Ze + Dofy_b)
 * These formulas are the ones we use to transform screen space points
 * to account for different lens locations.
 * We can calculate the key variables in these equations by finding the
 * the screen space coordinates of the points A=(0,0,1) and B=(1,1,1):
 * XsA = (a*0 + c*1 + g) / (f*1)
 *     = (c+g)/f
 *       XsB = (a+c+g)/f
 *       XsB-XsA = a/f
 *       YsB-YsA = d/f
 * and it follows that
```

```
 * Dofx_a = (XsB-XsA) * lensradius
 * Dofy_a = (YsB-YsA) * lensradius
 * Dofx_b = -Dofx_a/focaldistance
 * Dofy_b = -Dofy_a/focaldistance
 */
    if (PinHoleCamera) return ;

lensradius = 0.5 * FocalLength / FStop ;
    EyeToScreenXY(&Aeye,&Ascreen) ;
    EyeToScreenXY(&Beye,&Bscreen) ;
    Dofx_a = lensradius * (Bscreen.x - Ascreen.x) ;
    Dofy_a = lensradius * (Bscreen.y - Ascreen.y) ;
    Dofx_b = -Dofx_a / FocalDistance ;
    Dofy_b = -Dofy_a / FocalDistance ;
} static int VisEndBucket(xb,yb)
    int xb,yb ;
{
    float *jx, *jy, *jt, *jlx, *jly ;
    int x,y ;
    register int s, i ;
    register struct mpoly *mp ;
    struct mpoly *MpGetBucket() ;
    int left, right, top, bottom ;
    float alpha, salpha;
#if ALPHABETA
    float beta0, beta1, beta2, beta3, oma ;
#endif
    struct bbox bound(), box, speedbox ;
    struct bbox boundspeed() ;
    int xmin, xmax, ymin, ymax ;
    static struct xyz vertex[4], v[4] ;
    int nsample, pixel ;
    float locx, locy, dx, dy, lx, ly, rx, ry ;
    float ax, ay, bx, by, lensx, lensy ;

left   = Minx + xb*XPerBucket ;
    top    = Miny + yb*YPerBucket ;
    right  = left + XPerBucket - 1 ;
    bottom = top  + YPerBucket - 1 ;

mp=MpGetBucket(xb,yb);
    if (!mp) goto emptybucket;

bzero ((char *)Pixel, FiltersPerBucket*sizeof(struct pixelrgba)) ;
    CalcSamplesPerBucket(mp) ;
    bzero ((char *)Point, SamplesPerBucket*sizeof(struct visiblepoint *));
    jx  = &XJitter[(int)(23*drand())] ;
    jy  = &YJitter[(int)(23*drand())] ;
    jt  = &TJitter[(int)(23*drand())] ;
    jlx = &LXJitter[(int)(23*drand())] ;
    jly = &LYJitter[(int)(23*drand())] ;
    for (; mp; mp=mp->next) {
        bcopy ((char *)mp->v,(char *)vertex,sizeof(vertex)) ;
        vertex[0].x -= left ;
        vertex[1].x -= left ;
        vertex[2].x -= left ;
        vertex[3].x -= left ;
        vertex[0].y -= top ;
        vertex[1].y -= top ;
        vertex[2].y -= top ;
        vertex[3].y -= top ;
        box = bound(vertex) ;
        mp->min.z = box.min.z ;
        mp->max.z = box.max.z ;
#if MOTIONBLUR && !GLOSS
        if (mp->flag.moving) {
            speedbox = bound(mp->speed) ;
            if (speedbox.min.z<0) box.min.z += speedbox.min.z ;
            if (speedbox.max.z>0) box.max.z += speedbox.max.z ;
            mp->min.z = box.min.z ;
            mp->max.z = box.max.z ;
```

...VisCameraSetup

VisEndBucket

...VisEndBucket

```
#if DEPTHOFFIELD
        if (!PinHoleCamera)
            bounddof (&box) ;
#endif DEPTHOFFIELD
        speedbox.min.x /= NS ;
        speedbox.max.x /= NS ;

speedbox.min.y /= NS ;                                                          ...VieEndBucket
        speedbox.max.y /= NS ;
        if (speedbox.min.x<0) box.min.x += speedbox.min.x ;
        if (speedbox.max.x>0) box.max.x += speedbox.max.x ;
        if (speedbox.min.y<0) box.min.y += speedbox.min.y ;
        if (speedbox.max.y>0) box.max.y += speedbox.max.y ;
        for (s=0; s<NS; s++) {
            salpha = s/(float)NS ;
            locx = Location[s].x ;
            locy = Location[s].y ;
            lensx = Lens[s].x - .5/NS ;
            lensy = Lens[s].y - .5/NS ;
            xmin = box.min.x - locx - MaxXJitter ;
            ymin = box.min.y - locy - MaxYJitter ;
            xmax = box.max.x - locx /* + MinXJitter */ ;
            ymax = box.max.y - locy /* + MinYJitter */ ;
            if (xmin<0) xmin=0 ;
            if (xmax>=XPerBucket) xmax=XPerBucket-1 ;
            if (ymin<0) ymin=0 ;
            if (ymax>=YPerBucket) ymax=YPerBucket-1 ;
            for (y=ymin, dy=locy+ymin; y<=ymax; dy++, y++) {
                pixel = y*XPerBucket + xmin ;
                nsample = pixel*NS+s ;
                i = 7*s + 2*pixel ;
                for (x=xmin, dx=locx+xmin; x<=xmax; nsample+=NS, i+=2, dx++, x++) {
                    alpha = salpha + jt[i+2] ;
#if ALPHABETA
                    oma = 1 - alpha ;
                    beta0 = alpha / (alpha + oma*mp->abratio[0]) ;
                    beta1 = alpha / (alpha + oma*mp->abratio[1]) ;
                    beta2 = alpha / (alpha + oma*mp->abratio[2]) ;
                    beta3 = alpha / (alpha + oma*mp->abratio[3]) ;
#else
#define beta0 alpha
#define beta1 alpha
#define beta2 alpha
#define beta3 alpha
#endif
                    v[0].x = vertex[0].x + beta0*mp->speed[0].x ;
                    v[1].x = vertex[1].x + beta1*mp->speed[1].x ;
                    v[2].x = vertex[2].x + beta2*mp->speed[2].x ;
                    v[3].x = vertex[3].x + beta3*mp->speed[3].x ;
                    v[0].y = vertex[0].y + beta0*mp->speed[0].y ;
                    v[1].y = vertex[1].y + beta1*mp->speed[1].y ;
                    v[2].y = vertex[2].y + beta2*mp->speed[2].y ;
                    v[3].y = vertex[3].y + beta3*mp->speed[3].y ;
                    v[0].z = vertex[0].z + beta0*mp->speed[0].z ;
                    v[1].z = vertex[1].z + beta1*mp->speed[1].z ;
                    v[2].z = vertex[2].z + beta2*mp->speed[2].z ;
                    v[3].z = vertex[3].z + beta3*mp->speed[3].z ;
#if DEPTHOFFIELD
                    if (!PinHoleCamera) {
                        lx = lensx + jlx[i+3] ;
                        ly = lensy + jly[i+4] ;
                        ax = lx * Dofx_a ;
                        ay = ly * Dofy_a ;                                              ...VieEndBucket
                        bx = lx * Dofx_b ;
                        by = ly * Dofy_b ;
                        v[0].x += ax / v[0].z ;
                        v[1].x += ax / v[1].z ;
                        v[2].x += ax / v[2].z ;
                        v[3].x += ax / v[3].z ;
                        v[0].y += ay / v[0].z ;
                        v[1].y += ay / v[1].z ;
                        v[2].y += ay / v[2].z ;
                        v[3].y += ay / v[3].z ;
                        rx = dx + jx[i] - bx ;
                        ry = dy + jy[i+1] - by ;
                    }
                    else
```

```
#endif
                    {
                        rx = dx + jx[i] ;
                        ry = dy + jy[i+1] ;
                    }
                    v[0].x -= rx ; v[0].y -= ry ;
                    v[1].x -= rx ; v[1].y -= ry ;
                    v[2].x -= rx ; v[2].y -= ry ;
                    v[3].x -= rx ; v[3].y -= ry ;
                    sample(nsample,mp,v) ;
                }
            }
            box.min.x += speedbox.min.x ;
            box.max.x += speedbox.max.x ;
            box.min.y += speedbox.min.y ;
            box.max.y += speedbox.max.y ;
        }
    }
    else
#endif
    {
#if DEPTHOFFIELD
        if (!PinHoleCamera) {
            bounddof (&box) ;
#if GLOSS
            float d ;
            d = sqrt (mp->speed[0].x*mp->speed[0].x +
                      mp->speed[0].y*mp->speed[0].y +
                      mp->speed[0].z*mp->speed[0].z) ;
#endif
            v[0].z = vertex[0].z ;
            v[1].z = vertex[1].z ;
            v[2].z = vertex[2].z ;
            v[3].z = vertex[3].z ;
            for (s=0; s<NS; s++) {
                locx = Location[s].x ;
                locy = Location[s].y ;
                lensx = Lens[s].x - .5/NS ;
                lensy = Lens[s].y - .5/NS ;
                xmin = box.min.x - locx - MaxXJitter ;
                ymin = box.min.y - locy - MaxYJitter ;
                xmax = box.max.x - locx /* + MinXJitter */ ;
                ymax = box.max.y - locy /* + MinYJitter */ ;
                if (xmin<0) xmin=0 ;
                if (xmax>=XPerBucket) xmax=XPerBucket-1 ;
                if (ymin<0) ymin=0 ;
                if (ymax>=YPerBucket) ymax=YPerBucket-1 ;
                for (y=ymin, dy=locy+ymin; y<=ymax; dy++, y++) {
                    pixel = y*XPerBucket + xmin ;
                    nsample = pixel*NS+s ;
                    i = 7*s + 2*pixel ;
                    for (x=xmin, dx=locx+xmin; x<=xmax; nsample+=NS, i+=2, dx++, x++) {
                        lx = lensx + jlx[i+3] ;
                        ly = lensy + jly[i+4] ;
#if GLOSS
                        lx *= d ;
                        ly *= d ;
#endif
                        ax = lx * Dofx_a ;
                        ay = ly * Dofy_a ;
                        bx = lx * Dofx_b ;
                        by = ly * Dofy_b ;
                        rx = dx + jx[i] - bx ;
                        ry = dy + jy[i+1] - by ;
                        v[0].x = vertex[0].x - rx + ax/vertex[0].z ;
                        v[1].x = vertex[1].x - rx + ax/vertex[1].z ;
                        v[2].x = vertex[2].x - rx + ax/vertex[2].z ;
                        v[3].x = vertex[3].x - rx + ax/vertex[3].z ;
                        v[0].y = vertex[0].y - ry + ay/vertex[0].z ;
                        v[1].y = vertex[1].y - ry + ay/vertex[1].z ;
                        v[2].y = vertex[2].y - ry + ay/vertex[2].z ;
                        v[3].y = vertex[3].y - ry + ay/vertex[3].z ;
                        sample(nsample,mp,v) ;
                    }
                }
            }
```

...VisEndBucket

```
            }
            else
#endif
            {
                v[0].z = vertex[0].z ;
                v[1].z = vertex[1].z ;
                v[2].z = vertex[2].z ;
                v[3].z = vertex[3].z ;
                for (s=0; s<NS; s++) {
                    locx = Location[s].x ;
                    locy = Location[s].y ;
                    xmin = box.min.x - locx - MaxXJitter ;
                    ymin = box.min.y - locy - MaxYJitter ;
                    xmax = box.max.x - locx /* + MinXJitter */ ;
                    ymax = box.max.y - locy /* + MinYJitter */ ;
                    if (xmin<0) xmin=0 ;
                    if (xmax>=XPerBucket) xmax=XPerBucket-1 ;
                    if (ymin<0) ymin=0 ;
                    if (ymax>=YPerBucket) ymax=YPerBucket-1 ;
                    for (y=ymin, dy=locy+ymin; y<=ymax; dy++, y++) {           ...VisEndBucket
                        pixel = y*XPerBucket + xmin ;
                        nsample = pixel*NS+s ;
                        i = 7*s + 2*pixel ;
                        for (x=xmin, dx=locx+xmin; x<=xmax; nsample+=NS, i+=2, dx++, x++) {
                            rx = dx + jx[i] ;
                            ry = dy + jy[i+1] ;
                            v[0].x = vertex[0].x - rx ;
                            v[1].x = vertex[1].x - rx ;
                            v[2].x = vertex[2].x - rx ;
                            v[3].x = vertex[3].x - rx ;
                            v[0].y = vertex[0].y - ry ;
                            v[1].y = vertex[1].y - ry ;
                            v[2].y = vertex[2].y - ry ;
                            v[3].y = vertex[3].y - ry ;
                            sample(nsample,mp,v) ;
                        }
                    }
                }
            }
        }

CSGResolve() ;
        filter() ;
        freepoints() ;

DisplayWindow (Pixel, left-Border, right+Border, top-Border, bottom+Border) ;

MpEmptyBucket(xb,yb) ;
        return 1 ;

emptybucket:
        DisplayWindow ((struct pixelrgba *)0, left-Border, right+Border, top-Border, bottom+Border) ;
        MpEmptyBucket(xb,yb) ;
        return 0 ;
} static int VisEndFrame()                                                       VisEndFrame
{
    MpBucketEndFrame() ;
    DisplayEndFrame() ;
} static int VisFilter(type,width)                                               VisFilter
    char *type;
    float width ;
{
    int i ;
    if (FilterWidth<=0.) goto Error;
    for(i=0;i<NFILTERS;i++) {
        if (!strcmp(type,FilterName[i])) {
            FilterType = i ;
```

```
            FilterWidth = width;                                                    ...VisFilter
            BoxFilterFlag = (width==1.0 && !strcmp(type,"box"));
            return;
        }
    }
    fprintf (stderr, "The stochastic hider only has the following filters:\n") ;
    for(i=0;i<NFILTERS;i++)
        fprintf (stderr, "%s ",FilterName[i]) ;
    fprintf (stderr, "\n") ;
    return;
Error:
    fprintf (stderr, "Filter width must be >0\n") ;
} static int VisNewFrame (minx,maxx,miny,maxy,xper,yper,sideways,hither,yon)        VisNewFrame
    float hither, yon ;
{
    int nx ;

Hither = hither ;
    Yon = yon ;
    Border = FilterWidth/2. + 0.499 ;
    XPerBucket = xper ;
    YPerBucket = yper ;
    PixelsPerBucket = XPerBucket * YPerBucket ;
    FiltersPerBucket = (XPerBucket+2*Border) * (YPerBucket+2*Border) ;
    tablesinit(NxGrid,NyGrid);
    MaxSamplesPerBucket = PixelsPerBucket * NS ;
    Minx = minx - Border ;
    Miny = miny - Border ;
    Maxx = maxx + Border ;
    Maxy = maxy + Border ;
    nx = Maxx - Minx + 1 ;
    BucketsAcrossScreen = (nx+XPerBucket-1) / XPerBucket ;
    if (Point) {
        free((char *)Point) ;
        free((char *)Pixel) ;
    }
    Point = (struct visiblepoint **) malloc ((unsigned)(MaxSamplesPerBucket * sizeof(struct visiblepoint *) )) ;
    Pixel = (struct pixelrgba *) malloc ((unsigned)(FiltersPerBucket * sizeof(struct pixelrgba) )) ;

VisCameraSetup() ;
    MpBucketNewFrame (Minx, Maxx, Miny, Maxy, XPerBucket, YPerBucket, sideways, hither, yon) ;
    DisplayNewFrame (minx, maxx, miny, maxy, Border, XPerBucket, YPerBucket, sideways) ;

Hit = 0 ;
    Lerp = 0 ;
    Miss = 0 ;

return Border ;
} static int VisNewGrid(g)                                                          VisNewGrid
    struct grid *g;
{                                                                                 ...VisNewGrid
    MpBucketNewGrid(g) ;
} static int VisParam(ac,av) char **av; {                                           VisParam
    int x,y;
    while(ac>0) {
        if (!strcmp(*av,"grid")) {
            if (ac==1 || !isdigit(*av[1])) {
                NxGrid=4;
                NyGrid=4;
                av++;
                ac--;
            }
            else if (ac>=3) {
                x=atoi(av[1]) ;
                y=atoi(av[2]) ;
                if (x<-0 || y<=0) goto Error;
                NxGrid = x;
```

```
                NyGrid = y;
                av+=3;
                ac-=3;
            }
            else goto Error;
        }
        else if (!strcmp(*av,"jitter")) {
            if (ac>=1) {
                JitterFlag = OnOff(av[1]) ;
                av+=2;
                ac-=2;
            }
            else
                JitterFlag = 1 ;
                av++;
                ac--;
        }
        else goto Error;
    }
    return ;
Error:
    fprintf (stderr,"The stochastic hider can take these parameters:\n");
    fprintf (stderr,"\tgrid %%d %%d\n");
    fprintf (stderr,"\tjitter on/off\n");
} static int VisPrint(s)                                                                              VisPrint
    char *s ;
{
    if (s && (!strcmp(s,"stat"))) {
        register struct visiblepoint *vp ;
        register int n ;
        MpPrintStat() ;                                                                             ...VisPrint
        for (n=0, vp=VisFreeList; vp; vp=vp->next, n++) ;
        printf ("        Visiblepoints: %4d allocated", NVis) ;
        printf (" %4d kb", sizeof(struct visiblepoint)*NVis/1024) ;
        printf (" %4d used", NVisMaxUsed) ;
        printf (" %4d in use", NVisInUse) ;
        printf (" %4d free\n", n) ;
        n = Hit+Miss ;
        if (n==0) n=1 ;
        printf ("        Hider samples: %5.2f%% (%d hits and %d misses)\n",
                100.*Hit/(float)n, Hit, Miss) ;
        if (Hit)
            printf ("        Hider z lerps: %5.2f%% (%d lerps out of %d hits)\n",
                100.*Lerp/(float)Hit, Lerp, Hit) ;
    }
    else {
        printf ("        Hider:         stochastic sampler");
        printf (" (%d by %d samples per pixel)", NxGrid, NyGrid) ;
        printf (" jitter %s\n", JitterFlag?"on":"off" ) ;
        printf ("        Filter:        %s, %f pixels wide\n", FilterName[FilterType], FilterWidth) ;
        if (PinHoleCamera)
            printf ("        Camera:        pinhole\n") ;
        else {
            printf ("        Camera:        focal length   %f\n",FocalLength) ;
            printf ("                       f stop         %f\n",FStop) ;
            printf ("                       focal distance %f\n",FocalDistance) ;
        }
    }
} static struct bbox bound(v)                                                                         bound
    struct xyz v[4] ;
{
    struct bbox b ;

if (v[0].x < v[1].x) {
        if (v[2].x < v[3].x) {
            b.min.x = (v[0].x < v[2].x) ? v[0].x : v[2].x ;
            b.max.x = (v[1].x > v[3].x) ? v[1].x : v[3].x ;
        }
        else {
            b.min.x = (v[0].x < v[3].x) ? v[0].x : v[3].x ;
            b.max.x = (v[1].x > v[2].x) ? v[1].x : v[2].x ;
```

```
        }
    }
    else {
        if (v[2].x < v[3].x) {
            b.min.x = (v[1].x < v[2].x) ? v[1].x : v[2].x ;
            b.max.x = (v[0].x > v[3].x) ? v[0].x : v[3].x ;
        }
        else {
            b.min.x = (v[1].x < v[3].x) ? v[1].x : v[3].x ;
            b.max.x = (v[0].x > v[2].x) ? v[0].x : v[2].x ;
        }
    }
    if (v[0].y < v[1].y) {
        if (v[2].y < v[3].y) {
            b.min.y = (v[0].y < v[2].y) ? v[0].y : v[2].y ;
            b.max.y = (v[1].y > v[3].y) ? v[1].y : v[3].y ;
        }
        else {
            b.min.y = (v[0].y < v[3].y) ? v[0].y : v[3].y ;
            b.max.y = (v[1].y > v[2].y) ? v[1].y : v[2].y ;
        }
    }
    else {
        if (v[2].y < v[3].y) {
            b.min.y = (v[1].y < v[2].y) ? v[1].y : v[2].y ;
            b.max.y = (v[0].y > v[3].y) ? v[0].y : v[3].y ;
        }
        else {
            b.min.y = (v[1].y < v[3].y) ? v[1].y : v[3].y ;
            b.max.y = (v[0].y > v[2].y) ? v[0].y : v[2].y ;
        }
    }
    if (v[0].z < v[1].z) {
        if (v[2].z < v[3].z) {
            b.min.z = (v[0].z < v[2].z) ? v[0].z : v[2].z ;
            b.max.z = (v[1].z > v[3].z) ? v[1].z : v[3].z ;
        }
        else {
            b.min.z = (v[0].z < v[3].z) ? v[0].z : v[3].z ;
            b.max.z = (v[1].z > v[2].z) ? v[1].z : v[2].z ;
        }
    }
    else {
        if (v[2].z < v[3].z) {
            b.min.z = (v[1].z < v[2].z) ? v[1].z : v[2].z ;
            b.max.z = (v[0].z > v[3].z) ? v[0].z : v[3].z ;
        }
        else {
            b.min.z = (v[1].z < v[3].z) ? v[1].z : v[3].z ;
            b.max.z = (v[0].z > v[2].z) ? v[0].z : v[2].z ;
        }
    }
    return b ;
} if DEPTHOFFIELD
bounddof(b)
    struct bbox *b ;
{
    float b1, b2, zmin, zmax ;

/*if (PinHoleCamera) return ;*/ zmin = b->min.z ;
    zmax = b->max.z ;
    if (zmin<Hither) zmin = Hither ;
    if (zmax>Yon)    zmax = Yon ;

b1 = Dofx_a/zmin + Dofx_b ;
    b2 = Dofx_a/zmax + Dofx_b ;
    if (b1<0) b1 = -b1 ;
    if (b2<0) b2 = -b2 ;
    if (b2>b1) b1=b2 ;
    b->min.x -= b1 ;
    b->max.x += b1 ;
```

...bound bounddof

...bounddof

```
        b1 = Dofy_a/zmin + Dofy_b ;
        b2 = Dofy_a/zmax + Dofy_b ;
        if (b1<0) b1 = -b1 ;
        if (b2<0) b2 = -b2 ;
        if (b2>b1) b1=b2 ;
        b->min.y -= b1 ;
        b->max.y += b1 ;
    }
endif DEPTHOFFIELD static CalcSamplesPerBucket(mp) register struct mpoly *mp ; { }            CalcSamplesPerBucket static applyboxfilter()                                                     applyboxfilter
{
    int x, y ;
    register int s ;
    register struct pixelrgba *p ;
    register struct visiblepoint **vpp, *vp ;
    register float oneoverns ;
    int bb ;

bb = 2*Border ;
    oneoverns = 1./(float)NS ;
    vpp = Point ;
    vp = *vpp++ ;
    p = Pixel + Border*(XPerBucket+bb) + Border ;
    for (y=0; ++y<=YPerBucket; p+=bb) {
        for (x=0; ++x<=XPerBucket; p++) {
            for (s=0; ++s<=NS; vp=(*vpp++)) {
                if (vp && !vp->flag.matte) {
                    p->r += oneoverns * vp->color.r ;
                    p->g += oneoverns * vp->color.g ;
                    p->b += oneoverns * vp->color.b ;
                    p->a += (vp->flag.opaque) ? oneoverns : oneoverns * (1.-
                        (vp->trans.r+vp->trans.g+vp->trans.b)*(1./3.)) ;
                }
            }
        }
    }
}
static filter()                                                             filter
{
    int x, y ;
    register int j, i ;
    register float *f;
    register struct pixelrgba *p ;
    register struct visiblepoint *vp ;
    register int s ;
    struct visiblepoint **vpp ;
    float alpha ;
    struct pixelrgba *ploop, *pp ;
    int fskip, pskip, pback ;
    int width, bb ;

if (BoxFilterFlag) {
        applyboxfilter();
        return;
    }
/* Set up increments so that in the inner loop:
 *      f = &(Filter[s*FilterWidth*FilterWidth+j*FilterWidth+i]) ;
 *      p = Pixel + (y+j)*(XPerBucket+2*Border) + x + i ;
 */
    bb = Border+Border ;
    width = 1 + bb ;
    fskip = width*width ;
    pskip = sizeof(*p) * (XPerBucket+bb-width) ;
    pback = sizeof(*p) * (width*(XPerBucket+bb)) ;
    for (y=0, p=Pixel, vpp=Point, vp=(*vpp++); ++y<=YPerBucket; p+=bb) {
        for (x=0; ++x<=XPerBucket; p++) {
            for (s=0, f=Filter; ++s<=NS; vp=(*vpp++)) {
                if (vp && !vp->flag.matte) {
                    if (vp->flag.opaque) {
                        for (j=0; ++j<=width; ) {
                            for (i=0; ++i<=width; ) {
```

```
                            p->r += *f * vp->color.r ;
                            p->g += *f * vp->color.g ;
                            p->b += *f * vp->color.b ;
                            p++->a += *f++ ;
                        }
                        p = (struct pixelrgba *)((char *)p+pskip) ;
                    }
                    p = (struct pixelrgba *)((char *)p-pback) ;
                }
                else {
                    alpha = 1. - (1./3.) *
                        (vp->trans.r+vp->trans.g+vp->trans.b);
                    for (j=0; ++j<=width; ) {
                        for (i=0; ++i<=width; ) {
                            p->r += *f * vp->color.r ;
                            p->g += *f * vp->color.g ;
                            p->b += *f * vp->color.b ;
                            p++->a += *f++ *alpha ;
                        }
                        p = (struct pixelrgba *)((char *)p+pskip) ;
                }
                            p = (struct pixelrgba *)((char *)p-pback) ;
                        }
                    else {
                        f += fskip ;
                    }
                }
            }
        }
} float lerpz(v)
    register struct xyz v[4] ;
{
/*
 * Interpolate z using Shepard's method.  Use the Manhattan distance
 * to each vertex as an approximation to the actual distance.
 */
    float alpha[4], dist[4], d01, d23 ;
    float z ;
    dist[0]  = (v[0].x>0.) ? v[0].x : -v[0].x ;
    dist[0] += (v[0].y>0.) ? v[0].y : -v[0].y ;
    dist[1]  = (v[1].x>0.) ? v[1].x : -v[1].x ;
    dist[1] += (v[1].y>0.) ? v[1].y : -v[1].y ;
    dist[2]  = (v[2].x>0.) ? v[2].x : -v[2].x ;
    dist[2] += (v[2].y>0.) ? v[2].y : -v[2].y ;
    dist[3]  = (v[3].x>0.) ? v[3].x : -v[3].x ;
    dist[3] += (v[3].y>0.) ? v[3].y : -v[3].y ;
    d01 = dist[0] * dist[1] ;
    d23 = dist[2] * dist[3] ;
    alpha[0] = d23 * dist[1] ;
    alpha[1] = d23 * dist[0] ;
    alpha[2] = d01 * dist[3] ;
    alpha[3] = d01 * dist[2] ;
    z  = alpha[0] * v[0].z ;
    z += alpha[1] * v[1].z ;
    z += alpha[2] * v[2].z ;
    z += alpha[3] * v[3].z ;
    z /= alpha[0] + alpha[1] + alpha[2] + alpha[3] ;
    Lerp++ ;
    return z ;
} if GOURAUD
gouraud(v,mp,vp)
    register struct xyz v[4] ;
    register struct mpoly *mp ;
    register struct visiblepoint *vp ;
{
/*
 * Interpolate using Shepard's method.  Use the Manhattan distance
 * to each vertex as an approximation to the actual distance.
 */
```

```
            float alpha[4], sum, alphasum, dist[4], d01, d23 ;
            dist[0]  = (v[0].x>0.) ? v[0].x : -v[0].x ;
            dist[0] += (v[0].y>0.) ? v[0].y : -v[0].y ;
            dist[1]  = (v[1].x>0.) ? v[1].x : -v[1].x ;
            dist[1] += (v[1].y>0.) ? v[1].y : -v[1].y ;
            dist[2]  = (v[2].x>0.) ? v[2].x : -v[2].x ;
            dist[2] += (v[2].y>0.) ? v[2].y : -v[2].y ;
            dist[3]  = (v[3].x>0.) ? v[3].x : -v[3].x ;
            dist[3] += (v[3].y>0.) ? v[3].y : -v[3].y ;
            d01 = dist[0] * dist[1] ;
            d23 = dist[2] * dist[3] ;
            alpha[0] = d23 * dist[1] ;
            alpha[1] = d23 * dist[0] ;
            alpha[2] = d01 * dist[3] ;
            alpha[3] = d01 * dist[2] ;
            alphasum = alpha[0] + alpha[1] + alpha[2] + alpha[3] ;
            sum  = alpha[0] * mp->color[0].r ;
            sum += alpha[1] * mp->color[1].r ;
            sum += alpha[2] * mp->color[2].r ;
            sum += alpha[3] * mp->color[3].r ;
            vp->color.r = sum/alphasum ;
            sum  = alpha[0] * mp->color[0].g ;
            sum += alpha[1] * mp->color[1].g ;
            sum += alpha[2] * mp->color[2].g ;
            sum += alpha[3] * mp->color[3].g ;
            vp->color.g = sum/alphasum ;
            sum  = alpha[0] * mp->color[0].b ;
            sum += alpha[1] * mp->color[1].b ;
            sum += alpha[2] * mp->color[2].b ;
            sum += alpha[3] * mp->color[3].b ;
            vp->color.b = sum/alphasum ;
            sum  = alpha[0] * mp->trans[0].r ;
            sum += alpha[1] * mp->trans[1].r ;
            sum += alpha[2] * mp->trans[2].r ;
            sum += alpha[3] * mp->trans[3].r ;
            vp->trans.r = sum/alphasum ;
            sum  = alpha[0] * mp->trans[0].g ;
            sum += alpha[1] * mp->trans[1].g ;
            sum += alpha[2] * mp->trans[2].g ;
            sum += alpha[3] * mp->trans[3].g ;
            vp->trans.g = sum/alphasum ;
            sum  = alpha[0] * mp->trans[0].b ;
            sum += alpha[1] * mp->trans[1].b ;
            sum += alpha[2] * mp->trans[2].b ;
            sum += alpha[3] * mp->trans[3].b ;
            vp->trans.b = sum/alphasum ;
      }
endif GOURAUD static sample (nsample, mp, v)
      int nsample ;
      register struct mpoly *mp ;
      register struct xyz v[4] ;
{
      register struct visiblepoint *vp ;
      register int inside ;
      float z ;

/* If the micropolygon crosses the hither or yon plane during this
 * frame, see if it crosses it for this sample
 */
#if MOTIONBLUR && !GLOSS
      if (mp->flag.hitheryoncrossing && mp->flag.moving) {
            float zmin, zmax ;
            if (v[0].z < v[1].z) {
                  if (v[2].z < v[3].z) {
                        zmin = (v[0].z < v[2].z) ? v[0].z : v[2].z ;
                        zmax = (v[1].z > v[3].z) ? v[1].z : v[3].z ;
                  }
                  else {
                        zmin = (v[0].z < v[3].z) ? v[0].z : v[3].z ;
                        zmax = (v[1].z > v[2].z) ? v[1].z : v[2].z ;
                  }
            }
            else {
```

...gouraud sample

...sample

```
            if (v[2].z < v[3].z) {
                zmin = (v[1].z < v[2].z) ? v[1].z : v[2].z ;
                zmax = (v[0].z > v[3].z) ? v[0].z : v[3].z ;
            }
            else {
                zmin = (v[1].z < v[3].z) ? v[1].z : v[3].z ;
                zmax = (v[0].z > v[2].z) ? v[0].z : v[2].z ;
            }
        }
        if (zmin<Hither || zmax>Yon) goto Outside ;
    }
endif MOTIONBLUR && !GLOSS /*
 * The inside test has been unrolled for speed. This test usually takes
 * 6 comparisons and branches, 4 multiplications, and 1-9 assignments.
 * > If vertices 0 and 2 have different y signs, then both
 *     > The line from vertex 1 to either vertex 0 or vertex 2 crosses the x axis,
 *       depending on the sign of vertex 1.
 *     > The line from vertex 3 to either vertex 0 or vertex 2 crosses the x axis,
 *       depending on the sign of vertex 3.
 * > Otherwise, if vertices 0 and 2 have the same sign, then
 *     > The lines from vertex 1 to vertex 0 and vertex 2 either both cross the x
 *       axis or both do not cross the x axis, depending on the sign of vertex 1.
 *     > The lines from vertex 3 to vertex 0 and vertex 2 either both cross the x
 *       axis or both do not cross the x axis, depending on the sign of vertex 3.
 * For every line that crosses the x axis, we test the sign of the crossing
 * and toggle "inside" if the crossing is positive.  At the end, "inside" is
 * set iff we encountered an odd number of positive x crossings.
 */
    inside = 0 ;
    if (v[0].y > 0.0) {
        if (v[2].y < 0.0) {
            if (v[1].y < 0.0)
                { if (v[1].x*v[0].y > v[1].y*v[0].x) inside = ~inside; }
            else
                { if (v[2].x*v[1].y > v[2].y*v[1].x) inside = ~inside; }
            if (v[3].y < 0.0)
                { if (v[3].x*v[0].y > v[3].y*v[0].x) inside = ~inside; }
            else
                { if (v[2].x*v[3].y > v[2].y*v[3].x) inside = ~inside; }
        }
        else {
            if (v[1].y < 0.0) {
                if (v[1].x*v[0].y > v[1].y*v[0].x) inside = ~inside;
                if (v[1].x*v[2].y > v[1].y*v[2].x) inside = ~inside;
            }
            if (v[3].y < 0.0) {
                if (v[3].x*v[0].y > v[3].y*v[0].x) inside = ~inside;
                if (v[3].x*v[2].y > v[3].y*v[2].x) inside = ~inside;
            }
        }
    }
    else {
        if (v[2].y > 0.0) {
            if (v[1].y > 0.0)
                { if (v[1].x*v[0].y < v[1].y*v[0].x) inside = ~inside; }
            else
                { if (v[2].x*v[1].y < v[2].y*v[1].x) inside = ~inside; }
            if (v[3].y > 0.0)
                { if (v[3].x*v[0].y < v[3].y*v[0].x) inside = ~inside; }
            else
                { if (v[2].x*v[3].y < v[2].y*v[3].x) inside = ~inside; }
        }
        else {
            if (v[1].y > 0.0) {
                if (v[1].x*v[0].y < v[1].y*v[0].x) inside = ~inside;
                if (v[1].x*v[2].y < v[1].y*v[2].x) inside = ~inside;
            }
            if (v[3].y > 0.0) {
                if (v[3].x*v[0].y < v[3].y*v[0].x) inside = ~inside;
                if (v[3].x*v[2].y < v[3].y*v[2].x) inside = ~inside;
            }
        }
    }
```

...sample

```
/*
 * If the sample point is inside the polygon, and the micropolygon
 * crosses the hither or yon plane, interpolate to find the value of
 * z at the sample point. Test whether this z is between the hither
 * and yon planes.
 */
    if (!inside) goto Outside ;

if (mp->flag.hitheryoncrossing) {
        z = lerpz (v) ;
        if (z<Hither || z>Yon) goto Outside ;
    }
    if (!VisFreeList) {
        int vismalloced, i ;
        VisFreeList = (struct visiblepoint *) malloc ((unsigned)VisMallocSize) ;
        vismalloced = VisMallocSize/sizeof(struct visiblepoint) ;
        NVis += vismalloced ;
        for (i=1, vp=VisFreeList; i<vismalloced; vp++, i++) {
            vp->next = vp+1 ;
        }
        vp->next = 0 ;
    } vp = VisFreeList ;
    VisFreeList = VisFreeList->next ;
    NVisInUse++ ;
    if (NVisInUse>NVisMaxUsed) NVisMaxUsed=NVisInUse ;

#if CSG
    vp->csgtree = mp->csgtree ;
    vp->csgnode = mp->csgnode ;
#endif CSG
    vp->glasshackopacity = mp->glasshackopacity ;
    vp->flag = mp->flag ;
    if (mp->flag.hitheryoncrossing) {
        vp->minz = z ;
        vp->maxz = z ;
        vp->flag.lerpdone = 1 ;
    }
    else {
        vp->minz = mp->min.z ;
        vp->maxz = mp->max.z ;
        vp->flag.lerpdone = 0 ;
    }
    bcopy ((char *)v,(char *)vp->v,sizeof(vp->v)) ;
#if GOURAUD
    if (mp->flag.gouraud)
        gouraud (v,mp,vp) ;
    else {
        vp->color = mp->color[0] ;
        vp->trans = mp->trans[0] ;
    }
    else
        vp->color = mp->color ;
        vp->trans = mp->trans ;
#endif GOURAUD
    vp->next = Point[nsample] ;
    Point[nsample] = vp ;
    Hit++ ;
    return ;

Outside:
    Miss++ ;
    return ;

bit reversal, but mapped back onto 0-n */
permute(i,n) {
    register int j,a,b;
    j=0;
    for(b=1;b+b<n;b+=b) ;
    for(a=1;b>=1;a+=a,b/=2)
        if (i-b>=0) {i-=b; j+=a;}
    if (j>=n) j=a+1-j;
    return j;
}
```

...sample permute

*tablesinit*

```
tablesinit(nx,ny) {
    register int i, j, s ;
    int x, y, t, f ;
    float dx, dy, dt, sum ;
    int width ;

NS = nx*ny;
    SamplesPerBucket = PixelsPerBucket * NS ;
    width = 1 + 2 * Border ;

/* malloc room for tables */
    if (Location) free((char *)Location) ;
    if (Filter) free((char *)Filter) ;
    if (Lens) free((char *)Lens) ;
    Location = (struct xy *)malloc(NS*sizeof(struct xy)) ;
    Filter = (float *)malloc(NS*width*width*sizeof(float)) ;
    Lens = (struct xy *)malloc(NS*sizeof(struct xy)) ;

/* Calculate table of random numbers */
    if (JitterFlag) {
        MaxXJitter = 1./nx;
        MaxYJitter = 1./ny;
        for (s=0; s<NJITTER; s++) {
            XJitter[s] = drand()/nx ;
            YJitter[s] = drand()/ny ;
            TJitter[s] = drand()/NS ;
            LXJitter[s] = drand()/nx ;
            LYJitter[s] = drand()/ny ;
        }
        MaxXJitter -= (float)0.999999 ;
        MaxYJitter -= (float)0.999999 ;
    }
    else {
        MaxXJitter = 0.5/nx;
        MaxYJitter = 0.5/ny;
        for (s=0; s<NJITTER; s++) {
            XJitter[s] = 0.5/nx ;
            YJitter[s] = 0.5/ny ;
            TJitter[s] = 0.5/NS ;
            LXJitter[s] = 0.5/nx ;
            LYJitter[s] = 0.5/ny ;
        }
        MaxXJitter -= (float)0.999999 ;
        MaxYJitter -= (float)0.999999 ;
    }
/* Calculate locations */
    for (s=0, x=0; x<nx; x++) {
        for (y=0; y<ny; y++, s++) {
            t=permute(s,NS);
            Location[t].x = x / (float)nx ;
            Location[t].y = y / (float)ny ;
        }
    }

/* Create filter table. */
/* Calculate filter values for the center of each sampling region. */
    sum = 0.0 ;
    for (s=0, f=0; s<NS; s++) {
        for (j=0; j<width; j++) {
            for (i=0; i<width; f++, i++) {
                dx = Location[s].x + 0.5/nx - (i - Border +.5) ;
                dy = Location[s].y + 0.5/ny - (j - Border +.5) ;
                Filter[f] = (*FilterRoutine[FilterType])(dx,dy) ;
                sum += Filter[f] ;
            }
        }
    }

/* Normalize filter */
    for (i=0; i<NS*width*width; i++ )
        Filter[i] /= sum ;

/* Lens. This is a kludge for now - uses a square lens */
    for (s=0; s<NS; s++ ) {
        Lens[s].x = Location[s].x ;
        Lens[s].y = Location[s].y ;
    }
```

*...tablesinit*

```
} static freelist (vp)
    register struct visiblepoint *vp ;
{ register struct visiblepoint *p ;
    register int n ;

if (!vp) return ;
    for (p=vp, n=1; p->next; n++, p=p->next) ;
    p->next = VisFreeList ;
    NVisInUse -= n ;
    VisFreeList = vp ;
} static freepoints()
{
    register int n ;
    register struct visiblepoint **head ;
    for (n=0, head=Point; n<SamplesPerBucket; head++, n++) {
        freelist (*head) ;
    }
} if CSG
/*------------------------- CSG code -------------------------*/ define CSGDifferenceOp 1
define CSGIntersectionOp 2
define CSGUnionOp 3 define MAXTREE 64
static struct CSGnode *Tree[MAXTREE];

static int CSGNewTree(n,tree)
    int n;
    struct CSGnode *tree;
{
    if (n>=MAXTREE) {
        fprintf (stderr, "Maximum number of trees exceeded.\n") ;
        Error() ;
        return;
    }
    Tree[n] = tree;
} static int CSGResolve()
{
    int ntree ;
    register int n ;
    register struct visiblepoint **vp ;
    register struct visiblepoint *resolvedlist, *front, *vis ;
    struct visiblepoint *treelist ;
    struct visiblepoint *extract_csgtree(), *mergelists();
    struct visiblepoint *extract_csgnode(), *sortfront() ;

for (n=0, vp=Point; n<SamplesPerBucket; vp++, n++) {
        vis = 0 ;
        while (front=sortfront(vp)) {
            if (front->flag.pantshack) {
                *vp = front->next ;
                front->next = 0 ;
                freelist(front) ;
                front = sortfront(vp) ;
                if (front && front->flag.torsohack) {
                    *vp = front->next ;
                    front->next = 0 ;
                    freelist(front) ;
                }
            }
```

*freelist*

*freepoints*

*...freepoints*

*CSGNewTree*

*CSGResolve*

```
        else if (front->csgnode) {
            ntree = front->csgtree ;
            treelist = extract_csgtree (ntree, vp) ;
            csg_resolve_tree (Tree[ntree], 0, &treelist) ;
            resolvedlist = extract_csgnode (0, &treelist) ;
            freelist ( treelist ) ;
            *vp = mergelists (resolvedlist,*vp) ;
        }
        else {
            *vp = front->next ;
            if (vis) {
                front->color.r *= vis->trans.r ;
                front->color.g *= vis->trans.g ;
                front->color.b *= vis->trans.b ;
                front->color.r += vis->color.r ;
                front->color.g += vis->color.g ;
                front->color.b += vis->color.b ;
                front->trans.r *= vis->trans.r ;
                front->trans.g *= vis->trans.g ;
                front->trans.b *= vis->trans.b ;
            }
            front->next = vis ;
            vis = front ;
            if (vis->flag.glasshack && *vp) {
                float alpha, comp ;
                front = sortfront(vp) ;
                alpha = vis->glasshackopacity ;
                comp = vis->color.r ;
                vis->color.r *= alpha ;
                vis->color.r += (1-alpha) * comp * front->color.r ;
                comp = vis->color.g ;
                vis->color.g *= alpha ;
                vis->color.g += (1-alpha) * comp * front->color.g ;
                comp = vis->color.b ;
                vis->color.b *= alpha ;
                vis->color.b += (1-alpha) * comp * front->color.b ;
            }
            if (vis->flag.opaque) break ;
        }
    }
    *vp = mergelists (vis, *vp) ;
} static csg_resolve_surface (lista, listb, id, op)
    register struct visiblepoint *lista, *listb ;
    int id, op ;
{
    register int a, b ;

/* Go through two sorted lists of points, determining which points are
 * actually on the surface according to the specified csg operator.
 * Mark the points that are on the surface with the specified node id.
 * A point from listb is on the surface if "a" is set; a point from
 * lista is on the surface is "b" is set.
 * > For the union operator, accept points from lista iff we are outside
 *   of volume b, and accept points from listb iff we are outside of
 *   volume a. Since we are initially outside of both volumes, "a" and
 *   "b" are both initially true.
 * > For the intersection operator, accept points from one list iff we
 *   are inside the other volume. Since we are initially not inside
 *   either volume, "a" and "b" are both initially false.
 * > For the difference operator (a minus b), accept points from lista
 *   iff we are outside of volume b, and accept points from listb iff
 *   we are inside volume a. Since we are initially outside of b and
 *   not inside a. "b" is initially true and "a" is initially false.
 * > For all three operators, toggle "a" or "b" when we pass through
 *   one of the surfaces of a or b, respectively.
 */
    a = b = 0 ;
    switch (op) {
    case CSGUnionOp:            a = ~a ;
    case CSGDifferenceOp:       b = ~b ;
    case CSGIntersectionOp:     break ;
    }
```

*...CSGResolve*

*csg_resolve_surface*

*...csg_resolve_surface*

```
    while (lista && listb) {
        if (lista->minz < listb->minz) {
            if (b) lista->csgnode = id ;
            lista = lista->next ;
            a = ~a ;
        }
        else {
            if (a) listb->csgnode = id ;
            listb = listb->next ;
            b = ~b ;
        }
    }
    if (b)
        for (;lista;lista=lista->next) lista->csgnode = id ;
    if (a)
        for (;listb;listb=listb->next) listb->csgnode = id ;
} static struct visiblepoint *extract_csgnode (nodeid, list)
    int nodeid ;
    register struct visiblepoint **list ;
{
    register struct visiblepoint *thisid, *notthisid, *vp, *next ;

/* Extract all points with the specified node number from the list.
 * Return a pointer to the head of a new list containing only the
 * extracted points.
 */
    thisid = 0 ;
    notthisid = 0 ;
    next = *list ;
    while (vp=next) {
        next = vp->next ;
        if (vp->csgnode == nodeid) {
            vp->next = thisid ;
            thisid = vp ;
        }
        else {
            vp->next = notthisid ;
            notthisid = vp ;
        }
    }

*list = notthisid ;
    return thisid ;
} static struct visiblepoint *extract_csgtree (ntree, list)
    int ntree ;
    register struct visiblepoint **list ;
{
    register struct visiblepoint *intree, *notintree, *vp, *next ;

intree = notintree = 0 ;
    vp = *list ;
    while (vp) {
        next = vp->next ;
        if (vp->csgtree == ntree) {
            vp->next = intree ;
            intree = vp ;
        }
        else {
            vp->next = notintree ;
            notintree = vp ;
        }
        vp = next ;
    }

*list = notintree ;
    return intree ;
}
```

*extract_csgnode*

*...extract_csgnode*

*extract_csgtree*

```
static struct visiblepoint *findfront(list)                                    findfront
    register struct visiblepoint *list;
{
    register struct visiblepoint *front, *vp ;

/* This routine returns a pointer to the frontmost point of a list
 * of visiblepoints. The z value of each point is stored as the
 * minimum and maximum z values of its micropolygon. The exact
 * z value is only calculated (by interpolation) if it is needed.
 * The exact value is stored in both the minimum and maximum z fields.
 * > Find the point 'front' with the smallest minimum z.
 * > If that point has an interpolated z value, we're done.
 * > If that point's maximum z value is in front of the minimum z
 *   of every other point, we're done.
 * > Otherwise we go through the list again, this time using the
 *   exact values of z calculated by interpolation.
 */
    if (!list) return 0 ;                                                      ...findfront for (front=vp=list; vp; vp=vp->next)
        if (vp->minz < front->minz)
            front = vp ;

if (front->flag.lerpdone) goto Done ;

for (vp=list; vp; vp=vp->next)
        if (vp!=front && vp->minz<front->maxz) goto Lerp;
    goto Done;

Lerp:
    front->minz = front->maxz = lerpz(front->v) ;
    front->flag.lerpdone = 1 ;
    for (vp=list; vp; vp=vp->next) {
        if (vp->minz < front->minz) {
            if (vp->flag.lerpdone)
                front = vp ;
            else {
                vp->minz = vp->maxz = lerpz(vp->v) ;
                vp->flag.lerpdone = 1 ;
                if (vp->minz < front->minz)
                    front = vp ;
            }
        }
    }

Done:
    return front ;
} static struct visiblepoint *mergelists(a,b)                                    mergelists
    register struct visiblepoint *a, *b ;
{
    register struct visiblepoint *p ;

if (!a) return b ;
    if (!b) return a ;

for (p=a; p->next; p=p->next) ;
    p->next = b ;
    return a;
} static csg_resolve_tree (node, id, list)                                       csg_resolve_tree
    register struct CSGnode *node ;
    int id ;
    register struct visiblepoint **list ;                                      ...csg_resolve_tree
{
    struct visiblepoint *list0, *list1 ;
    struct visiblepoint *extract_csgnode(), *mergelists() ;

if (node->child[0]) csg_resolve_tree (node->child[0], node->id[0], list);
    if (node->child[1]) csg_resolve_tree (node->child[1], node->id[1], list);
    list0 = extract_csgnode (node->id[0], list) ;
    list1 = extract_csgnode (node->id[1], list) ;
```

```
        if (list0 || list1) {
            if (list0) sortlist (&list0) ;
            if (list1) sortlist (&list1) ;
            csg_resolve_surface (list0, list1, id, node->op) ;
            *list = mergelists (list0,*list) ;
            *list = mergelists (list1,*list) ;
        }
} static struct visiblepoint *sortfront(head)                                    sortfront
    register struct visiblepoint **head;
{
    register struct visiblepoint *prev, *temp, *vp, *front ;
/*
 * (*head) points to a list of visible points. This routine puts
 * the frontmost point at the head of the list.
 */
    if (!*head) return 0 ;
    front = findfront(*head) ;
    for (prev= *head, vp=prev->next; vp; prev=vp, vp=vp->next) {
        if (vp==front) {
            prev->next = front->next ;
            front->next = *head ;
            *head = front ;
            return *head ;
        }
    }
    return *head ;
} static sortlist (list)                                                         sortlist
    register struct visiblepoint **list ;
{
    if ((*list)->next) {
        (void) sortfront (list) ;
        sortlist (&((*list)->next)) ;
    }
} else
static int CSGNewTree(){;}                                                     CSGNewTree
static int CSGResolve(){;}                                                     CSGResolve
#endif CSG
/* ssvis.h 1.9 85/05/20 */ include <reyes.h> struct visflags {
    unsigned        moving : 1 ;
    unsigned        opaque : 1 ;
    unsigned        cubicmotion : 1 ;
    unsigned        matte : 1 ;
    unsigned        hitheryoncrossing : 1 ;
    unsigned        lerpdone : 1 ;
    unsigned        gouraud : 1 ;
unsigned pantshack : 1 ;
unsigned torsohack : 1 ;
unsigned glasshack : 1 ;
    } ;

struct mpoly {
    struct mpoly    *next ;
    int             minx, miny, maxx, maxy ;
    struct xyz      min, max ;
    struct xyz      v[4] ;
#if MOTIONBLUR
    struct xyz      speed[4] ;
#if CUBICMOTION
    struct xyz      speed2[4] ;
    struct xyz      speed3[4] ;
#endif CUBICMOTION
#endif MOTIONBLUR
#if GOURAUD
```

```
            struct color      color[4] ;
            struct color      trans[4] ;
#else
            struct color      color ;
            struct color      trans ;
#endif GOURAUD
#if CSG
            short             csgtree, csgnode ;
#endif CSG
#if DEPTHOFFIELD
            struct xy         dofborder ;
#endif DEPTHOFFIELD
            float             glasshackopacity ;
            struct visflags   flag ;
} ;

extern float Dofx_a, Dofx_b, Dofy_a, Dofy_b ;
extern int PinHoleCamera ;
```

*...lighthit*

```
                }
            if (hitlight != NULL)
                    return(hitalpha);
            return(-1.);
        } disperseray(oldray,maxdispersionangle)
vector oldray;
double maxdispersionangle;
        {
        double phi,theta,rho;
        double a,b,c,v,x,y,z;
        phi   = drand()*drand()*maxdispersionangle;
        theta = drand()*2*PI;
        a = oldray[0];
        b = oldray[1];
        c = oldray[2];
        rho = sqrt((double)(a*a+b*b+c*c));
        a = a/rho; b = b/rho; c = c/rho;
        x = rho*sin(phi)*cos(theta);
        y = rho*sin(phi)*sin(theta);
        z = rho*cos(phi);
        if ((v = sqrt((double)(b*b+c*c))) != 0)
                {
                oldray[0] = (x*v + z*a);
                oldray[1] = ( y*c - b*x*a + b*z*v)/v;
                oldray[2] = (-b*y - c*x*a + c*z*v)/v;
                }
        else
                {
                oldray[0] = z*a;
                oldray[1] = y;
                oldray[2] = -x*a;
                }
        }
```

*disperseray*

```
struct color
trace(viewing, level,time)
register struct ray *viewing;
float time;
        {
        double alpha,beta;
        struct ray newray;
        double diffuse, vdotn, kf, kn, specular, reflectionlength;
        struct color tracecolor, viewcolor, spherecolor;
        double spherereflectivity,spherebump;
        vector normal, incoming, reflection, tempvect, center;
        double radius;
        register struct sphere *hp;
        register struct light *lptr;
        matrix tempmatrix;
        double spinangle;

/*printf("trace(ray:(%f,%f,%f,%f,%f,%f),%d,%f)\n",
viewing->endpoint[0],
viewing->endpoint[1],
viewing->endpoint[2],
viewing->direction[0],
viewing->direction[1],
viewing->direction[2],
level,time);*/ alpha = spherehit(viewing,time,(level==0) && !translucencyray);
        beta  = lighthit(viewing,time);
        if ((beta >= 0) && ((alpha < 0) || (beta < alpha)))
```

*trace*

APPENDIX B

...trace

```
                return(hitlight->rgb);
        if (alpha < 0.)
                return(nullcolor);
        viewcolor.red =
        viewcolor.grn =
        viewcolor.blu = 0;
        viewcolor.alf = 1.;
        hp = hitsphere;
        VxAddLerp(alpha,viewing->endpoint,viewing->direction,newray.endpoint);

FindCenter(hp.time,center);
        radius = hp->radius;

normal[0] = (newray.endpoint[0]-center[0])/radius;
        normal[1] = (newray.endpoint[1]-center[1])/radius;
        normal[2] = (newray.endpoint[2]-center[2])/radius;
        normal[3] = 1.;

/*
  put normal through inverse transformation in order to extract
  original position on sphere.

that original position is then used to look up the parameters
  for the sphere
*/
        {
        double duration;
        struct movement *mptr;

mptr = hp->mptr;
        VxCopy(normal,tempvect);
        MxVectorMultiply(tempvect,hp->M,tempvect);
        while (mptr)
                {
                if (mptr->starttime >= time) break;
                MxVectorMultiply(tempvect,mptr->MR1MR2,tempvect);
                if (mptr->mptr)
                        if (mptr->mptr->starttime >= time)
                                duration = time - mptr->starttime;
                        else
                                duration = mptr->mptr->starttime - mptr->starttime;
                else
                        duration = time - mptr->starttime;
                spinangle = MxDegrees(duration*VxLength(mptr->translate)/hp->radius);
                MxRotate(spinangle,'z',tempmatrix);
                MxVectorMultiply(tempvect,tempmatrix,tempvect);
                MxVectorMultiply(tempvect,mptr->IR2IR1,tempvect);
                mptr = mptr->mptr;
                }
        }

/*
  now tempvect contains the original position of this endpoint in the
  picture map for this sphere.
*/
        spherebump = hp->phong;
        if (ABS(tempvect[2]) < halfstripewidth)
                {
                spherecolor = hp->stripecolor;
                spherereflectivity = spherecolor.alf;
                }
        else
        if ((ABS(tempvect[2]) < halfringwidth))
                {

/*% cc -go -a % cook.o boundsphere.o -lG -lrpac -lpicio -ltkp -lsa -lmx -lxm -lm
*/
#include <stdio.h>
#include <asrg.h>
#include <math.h>
#include <picio.h>
#include <rpac.h>
#include <ikehack.h>
#include <bliss.h>
#include <MxMatrix.h>
include <BuniOpen.h> include <rrand.h> include <VxVector.h> define SS 64
define XSIZE 512
#define YSIZE 488
```

```
int spfx = XSIZE;
int spfy = YSIZE;
int ppfx = XSIZE;
int ppfy = YSIZE;
int pps  = 1;
int ssize = 0;
int rpp = SS;

#define VPIX    .7868852459    /* = 48/61, vertical height of a pixel */
#define MAXLEVEL 1
define NSPHERE 100 int translucencyray = FALSE;

double fieldofview = 30.;
vector viewpoint;
matrix normalizer,inversenormalizer;

double halfstripewidth   = .4722;
double halfringwidth     = .85;
double linethickness     = .05;
double ringradius        = .44;
/* ringradius = sqrt(1-(halfringwidth+linethickness)^2) */ int dms = 0;

int ystart = 0;
int yend = 100000;
setystart()
        {
        ystart = atoi(aargv[1]);
        yend = atoi(aargv[2]);
        if (yend < ystart)
                {
                fprintf(stderr,"bad y bounds\n");
                exit(1);
                }
        }
int debug = FALSE;
setdebug() {debug = TRUE;} struct color
        {
        double red, grn, blu, alf;
        };
struct color nullcolor = {0.,0.,0.,0.};
struct color ivorycolor = {0.85,0.85,0.55,0.8};
double ivorybump = 1000.;
double ivoryreflectivity = 0.8;
struct color blackcolor = {0.05,0.05,0.05,1.};
double blackbump = 1000.;
double blackreflectivity = 0.8;

struct window {int minx,maxx,miny,maxy;};

struct movement
        {
        matrix MR1,MR2,IR2,IR1;
        double starttime;
        vector translate;
        struct movement *mptr;
        };
struct sphere
        {
        vector center;
        double radius;
        matrix M;
        struct color outsidecolor,stripecolor;
        struct movement *mptr;
        double refractiveindex;    /* refractive index */
        double transmitivity;      /* fractional intensity of transmitted rays */
        double specularity;        /* amount of specular reflection */
        double phong;              /* specular bump width (Phong exponent) */
        double reflectiondispersion;
        double transmissiondispersion;
        int active;
        struct window w;
        BuniPtrType buniptr;
        int fbxsize,fbysize;
        }
sphere[NSPHERE];

struct sphere *sphere = sphere;

#define NLIGHT 50
struct light
        {
        vector location0;
        double intensity0;
        vector location1;
        double intensity1;
```

*setystart*

*setdebug*

```
#define    EPSILON 1e-6
```

```
FindCenter(sptr,time,center)                                                    FindCenter
struct sphere *sptr;
double time;
vector center;
        {
        double duration;
        struct movement *mptr;

VxCopy(sptr->center,center);
        mptr = sptr->mptr;
        while (mptr)
                {
                if (mptr->starttime >= time) break;
                if (mptr->mptr)
                        if (mptr->mptr->starttime >= time)
                                duration = time - mptr->starttime;
                        else
                                duration = mptr->mptr->starttime - mptr->starttime;
                else
                        duration = time - mptr->starttime;
                VxAddLerp(duration,center,mptr->translate,center);
                mptr = mptr->mptr;
                }
        }
```

```
double
spherehit(oldray,time,level0)                                                   spherehit
register struct ray *oldray;
float time;
        {
        register struct sphere *sptr;
        double hitalpha;
        double alpha, discriminant, a, b, c;
        vector newendpoint;
        vector center;
        double radius;
```

/*printf(" spherehit(ray:[%f,%f,%f],[%f,%f,%f],%f]\n",
oldray->endpoint[0],oldray->endpoint[1],oldray->endpoint[2],
oldray->direction[0],oldray->direction[1],oldray->direction[2],time);*/

/* This routine tries to find a point on the sphere sptr and the oldray.
   Using alpha as the extent of the ray beyond oldray->endpoint,
   a quadratic in alpha can be formed whose coefficients a, b, c are
   as computed below.
*/

```
        hitsphere = NULL;
        a = VxDot(oldray->direction,oldray->direction);
        for (sptr = sphere; sptr != esphere; sptr++)
                {
                if (!level0 || sptr->active)
                        {
                        FindCenter(sptr,time,center);
                        radius = sptr->radius;

VxSubtract(oldray->endpoint,center,newendpoint);
                        b = 2*VxDot(newendpoint,oldray->direction);
                        c = VxDot(newendpoint,newendpoint)-radius*radius;
                        if ((discriminant = b*b - 4*a*c)<0.)
                                continue;
```
                                                                                ...spherehit
```
                        discriminant = sqrt((double)discriminant);

alpha = (-b+discriminant)/(2*a);
                        if (EPSILON < alpha &&
                            (hitsphere == NULL || alpha < hitalpha))
                                {
                                hitalpha = alpha;
                                hitsphere = sptr;
                                }
```

```
                    alpha = (-b-discriminant)/(2*a);
                    if (EPSILON < alpha &&
                        (hitsphere == NULL || alpha < hitalpha))
                            {
                            hitalpha = alpha;
                            hitsphere = sptr;
                            }
                    }
            if (hitsphere != NULL)
                    return(hitalpha);
            return(-1.);
            }
double
lighthit(oldray,time)                                                                          lighthit
register struct ray *oldray;
float time;
            {
            register struct light *lptr;
            double hitalpha;
            double alpha, discriminant, a, b, c;
            vector newendpoint;
            vector center;
            double radius;

hitlight = NULL;
            a = VxDot(oldray->direction,oldray->direction);
            for (lptr = light; lptr != elight; lptr++)
                    {
                    VxLerp(time,lptr->location0,lptr->location1,center);
                    radius = lptr->radius;
                    VxSubtract(oldray->endpoint,center,newendpoint);
                    b = 2*VxDot(newendpoint,oldray->direction);
                    c = VxDot(newendpoint,newendpoint)-radius*radius;
                    if ((discriminant = b*b - 4*a*c)<0.)
                            continue;
                    discriminant = sqrt((double)discriminant);

alpha = (-b+discriminant)/(2*a);
                    if (EPSILON < alpha &&
                        (hitsphere == NULL || alpha < hitalpha))
                            {
                            hitalpha = alpha;
                            hitlight = lptr;
                            } alpha = (-b-discriminant)/(2*a);
                    if (EPSILON < alpha &&
                        (hitsphere == NULL || alpha < hitalpha))
                            {
                            hitalpha = alpha;
                            hitlight = lptr;
                            } spherecolor = hp->outsidecolor;                                             ...trace
                    spherereflectivity = spherecolor.alf;
                    }
            else
            if (ABS(tempvect[2]) < halfringwidth+linethickness)
                    {
                    if (hp->outsidecolor.red != hp->stripecolor.red)
                            {
                            spherecolor = blackcolor;
                            spherereflectivity = blackreflectivity;
                            spherebump = blackbump;
                            }
                    else
                            {
                            spherecolor = ivorycolor;
                            spherereflectivity = ivoryreflectivity;
                            spherebump = ivorybump;
                            }
                    }
            else
            if (hp->buniptr)
                    {
                    int mapx,mapy;
                    RGBAPixelType RGBA;

{
                            if (tempvect[2] > 0)
                                    {
mapx = hp->fbxsize*(1 + (atan(tempvect[0]/tempvect[2])/(PI/2))/ringradius)/2;
mapy = hp->fbysize*(1 - (atan(tempvect[1]/tempvect[2])/(PI/2))/ringradius)/2;
                                    }
                            else
                                    {
mapx = hp->fbxsize*(1 + (atan(tempvect[0]/tempvect[2])/(PI/2))/ringradius)/2;
mapy = hp->fbysize*(1 - (atan(tempvect[1]/tempvect[2])/(PI/2))/ringradius)/2;
                                    }
```

```
                    SetBuniY(hp->buniptr,mapy);
                    SetBuniX(hp->buniptr,mapx);
                    GetBuniRGBA(hp->buniptr,&RGBA);
                    spherecolor.red    = RGBA.Red   /4095.;
                    spherecolor.grn    = RGBA.Green /4095.;
                    spherecolor.blu    = RGBA.Blue  /4095.;
                    spherereflectivity = RGBA.Alpha /4095.;
                    spherebump         = 1000;
                    }
            }
    else
            {
            spherecolor = ivorycolor;
            spherereflectivity = ivoryreflectivity;
            spherebump = ivorybump;
            } vdotn = VxDot(normal,viewing->direction);
    if (vdotn > 0.)
            {
            VxNegate(normal,normal);
            kn = 1./hp->refractiveindex;
            }
    else
            {
            vdotn = -vdotn;
            kn = hp->refractiveindex;

}
    if(vdotn != 0.)
            VxScalarMultiply(1/vdotn,viewing->direction,incoming);
    /* the only difference between the viewing direction and the incoming
       vector is this factor of 1/vdotn, 1 over the sin of the angle
       between the viewing vector and the normal
    */
    if (vdotn == 0.)
            VxCopy(viewing->direction,reflection);
    else
            VxAddLerp(2.,incoming,normal,reflection);

disperseray(reflection,hp->reflectiondispersion);

reflectionlength = VxLength(reflection);

/*
     * first, get the lightsource components
     */
    viewcolor.red = spherecolor.red *ambient;
    viewcolor.grn = spherecolor.grn *ambient;
    viewcolor.blu = spherecolor.blu *ambient;

for (lptr = light; lptr != elight; lptr++)
            {
            double intensity;
            vector lightcenter;
            vector random;
            random[3] = 1;
            for (;;)
                    {
                    random[0] = 2*drand()-1;
                    random[1] = 2*drand()-1;
                    random[2] = 2*drand()-1;
                    if (VxLength(random) <= 1) break;
                    }
            VxScalarMultiply(lptr->radius,random,random);

VxLerp(time,lptr->location0,lptr->location1,lightcenter);
            VxAdd(lightcenter,random,newray.direction);
            VxSubtract(newray.direction,newray.endpoint,newray.direction);
            VxNormalize(newray.direction,newray.direction);

if (spherehit(&newray,time,FALSE) > 0.)
                    continue;
            specular = VxDot(newray.direction,reflection)/reflectionlength;
            if (specular < 0.) specular = 0.;
            /*
             * Plastic alert
             */
            intensity = lptr->intensity0 + time*(lptr->intensity1-lptr->intensity0);
               /* specular = intensity * hp->specularity * pow(specular, spherebump);*/
            specular = hp->specularity * pow(specular, spherebump);
            diffuse  = intensity * VxDot(newray.direction,normal);
            viewcolor.red += specular + diffuse *spherecolor.red;
            viewcolor.grn += specular + diffuse *spherecolor.grn;
            viewcolor.blu += specular + diffuse *spherecolor.blu;
            }
    if (level == MAXLEVEL)
            return(viewcolor);
    /*
     * Now, the reflected component
     */
    if (spherereflectivity != 0.)
```

...trace

```
/*
        double exp(), alpha;
*/
                VxCopy(reflection.newray.direction);
                tracecolor = trace(&newray, level+1,time);
                viewcolor.red += tracecolor.red *spherereflectivity;
                viewcolor.grn += tracecolor.grn *spherereflectivity;
                viewcolor.blu += tracecolor.blu *spherereflectivity;
/*
if ((alpha = spherehit(&newray,time,FALSE) * VxLength(newray.direction)) > 0)
    {
    viewcolor.red -= spherecolor.red*ambient*spherereflectivity*exp(-alpha);
    viewcolor.grn -= spherecolor.grn*ambient*spherereflectivity*exp(-alpha);
    viewcolor.blu -= spherecolor.blu*ambient*spherereflectivity*exp(-alpha);
    }
*/
            }
        /*
         * Now, the transmitted component
         */
        if (hp->transmitivity != 0. && vdotn != 0.)
            {
            VxAdd(incoming,normal,tempvect);
            kf = kn * kn * VxDot(incoming,incoming) - VxDot(tempvect,tempvect);
            if (kf > 0.)
                {
                kf = 1./sqrt((double)kf);
                newray.direction[0] = kf*(normal[0]+incoming[0]) - normal[0];
                newray.direction[1] = kf*(normal[1]+incoming[1]) - normal[1];
                newray.direction[2] = kf*(normal[2]+incoming[2]) - normal[2];
                newray.direction[3] = 1.;

disperseray(newray.direction,hp->transmissiondispersion);

/*printf(" trace(ray:(%f,%f,%f,%f,%f,%f),%d,%f) -> ",
newray.endpoint[0],
newray.endpoint[1],
newray.endpoint[2],
newray.direction[0],
newray.direction[1],
newray.direction[2],
level+1,time);*/
                translucencyray = TRUE;
                                        tracecolor = trace(&newray, level,time);
                translucencyray = FALSE;
/*printf("%f,%f,%f\n",tracecolor.red,tracecolor.grn,tracecolor.blu);*/
                viewcolor.red += tracecolor.red *hp->transmitivity;
                viewcolor.grn += tracecolor.grn *hp->transmitivity;
                viewcolor.blu += tracecolor.blu *hp->transmitivity;
                }
            }
    return(viewcolor);
    }
pv12(x)
double x;
    {
    return((int)(16*drand()+4080.*(x<0.?0.:1.<x?1.:x)));
    } double Fn = 0.0;
double focaldistance = 1.0;

struct color eyetrace(x, y, t)
double x, y, t;
    {
    struct ray ray;
    vector screentarget,modeltarget,focaltarget,direction;
    double filmplanedistance;

/*printf("eyetrace(%f,%f,%f)\n",x,y,t);*/
    screentarget[0] = x;
    screentarget[1] = y;
    screentarget[2] = 1.;
    screentarget[3] = 1.;
    MxVectorMultiply(screentarget,inversenormalizer,modeltarget);
    VxSubtract(modeltarget,viewpoint,direction);
    filmplanedistance = VxLength(direction);
    VxAddLerp(focaldistance/filmplanedistance,viewpoint,direction,focaltarget);
        {
        vector random;
        random[2] = 0;
        random[3] = 1;
        for (;;)
            {
            random[0] = 2*drand()-1;
            random[1] = 2*drand()-1;
            if (VxLength(random) <= 1) break;
            }
```

```
                VxScalarMultiply(Fn.random,random);
                MxVectorMultiply(random,inversenormalizer,ray.endpoint);
            }
            VxSubtract(focaltarget,ray.endpoint,ray.direction);
            return(trace(&ray, 0, t));
        }

PFILE *picfile;

extern struct xy {float x,y;} Location[];
extern float Times[];
extern float Filter[4][SS][3][3];

double t0 = 0.0;
double t1 = 1.0;
settime()                                                                      settime
        {
        t0 = atof(aargv[1]);
        t1 = atof(aargv[2]);
        }
setppfxy()                                                                     setppfxy
        {
        ppfx = atoi(aargv[1]);
        ppfy = atoi(aargv[2]);
        spfx = 1 + (ppfx-1)/pps;
        spfy = 1 + (ppfy-1)/pps;
        }
setssize()                                                                     setssize
        {
        ssize = atoi(aargv[1]);
        pps = 1 << ssize;
        spfx = 1 + (ppfx-1)/pps;
        spfy = 1 + (ppfy-1)/pps;
        rpp = SS/(pps*pps);
        }
struct arg_cmd cmd[]={
        0,setppfxy,      "[-s %d %d]","ppfx ppfy",0,0,0,0,
        0,setssize,      "[-ss %d<0,3>]","ssize: 0, 1, 2, 3",0,0,0,0,
        0,settime,       "[-t %f %f]","starttime endtime",0,0,0,0,
        0,setdebug,      "[-d]","debug",0,0,0,0,
        0,setystart,     "[-y %d %d]","compute sample area %d to %d in y",0,0,0,0,
        0,0,(char *)std_cmd,0,0,0,0,
        0,0,0,0,0,0,0
};

remain(argc, argv)                                                             remain
char *argv[];
        {
        vector viewdirection,updirection,focuspoint,uppoint;
        char fbname[128];
        char label[256];
        int sx,sy;
        register struct light *ptr;
                vector abc;
                matrix MR1,MR2;
        int c;
        struct color pixel[SS];

yend = MIN(yend,spfy-1);
        sprintf(label,"pray -s %d %d -ss %d -t %f %f -y %d %d",
                ppfx,ppfy,ssize,t0,t1,ystart,yend);
        PicSetLabel(label);
        PicSetPsize(ppfx,(yend-ystart+1)*pps);
        PicSetTsize(ppfx,(yend-ystart+1)*pps);
        PicSetPformat(PF_RGBA);
        PicSetPmatting(PM_MTB);
        PicSetForce(1);
        PicSetOffset(0,ystart*pps);
        if((picfile=PicCreat(argv[1], 0444))==NULL){
                fprintf(stderr, "sphere: Can't create %s\n", argv[1]);
                exit(1);
        }
        picPreEncodeScanline(picfile, 0L);
        /*
         * Read some input
         */
        while((c=getchar()) != EOF) switch(c){
        case ' ': case '\t': case '\n':        break;
        case '#': do c=getchar(); while(c != '\n' && c != EOF); break;
        case 'f': if (scanf("%f",&fieldofview) != 1)
                        fprintf(stderr,"Invalid field of view \n");
                break;
        case 'e':
                if(scanf("%f%f%f%f%f%f%f%f%f",
                        &viewpoint[0],&viewpoint[1],&viewpoint[2],
                        &focuspoint[0],&focuspoint[1],&focuspoint[2],
                        &uppoint[0],&uppoint[1],&uppoint[2]
                        ) != 9)
                        fprintf(stderr, "Invalid viewpoint\n");
```

```
                else
                    {
                    uppoint[3] = 1;
                    viewpoint[3] = 1.;
                    focuspoint[3] = 1.;
                    VxSubtract(focuspoint,viewpoint,viewdirection);
                    focaldistance = VxLength(viewdirection);
                    VxSubtract(uppoint,viewpoint,updirection);
                    }
                break;
        case 'a':
                if(scanf("%lf", &ambient) != 1)
                        fprintf(stderr, "Invalid ambient light\n");         ...remain
                break;
        case 's':
                {
                double azimuth,pitch,roll;
if(scanf("%lf%lf%lf%lf%lf%lf%lf%lf%lf%lf%lf%lf%lf%lf%lf%lf%lf%lf%lf%s",
                &esphere->center[0], &esphere->center[1], &esphere->center[2],
                &esphere->radius,
                &azimuth,&pitch,&roll,
                &esphere->outsidecolor.red,&esphere->outsidecolor.grn,&esphere->outsidecolor.blu,&esphere->outsidecolor.alf,
                &esphere->stripecolor.red,&esphere->stripecolor.grn,&esphere->stripecolor.blu,&esphere->stripecolor.alf,
                &esphere->refractiveindex, &esphere->transmitivity,
                &esphere->specularity,&esphere->phong,
                fbname
                ) != 20)
                        fprintf(stderr, "Invalid sphere\n");
                else
                    {
                    double v;
                    matrix tempmatrix;
                    FbErrors(FBIGNORE);
                    if ((esphere->buniptr = FbOpen(fbname)) == NULL)
                        {
                        fprintf(stderr,"cannot open %s\n",fbname);
                        }
                    else
                        {
                        BuniCSRType csr;
                        esphere->fbxsize = GetXSize(esphere->buniptr);
                        esphere->fbysize = GetYSize(esphere->buniptr);
            csr.ChannelSel = 017;           /* all */
            csr.AutoIncDec = INCREMENT;
            csr.WriteTrigger = ALPHA_TRIGGER;
            csr.ReadTrigger = RED_TRIGGER;
            csr.XYMod = X_MOD;
            csr.BumpXY = 0;
            csr.WriteAddrMod = 0;
            csr.ReadAddrMod = 0;
            csr.LerpMode = 0;
            csr.LerpRequest = 0;
            SetBuniCSR(esphere->buniptr, csr);
                        fprintf(stderr,"%s: %d %d\n",fbname,esphere->fbxsize,esphere->fbysize);
                        }
                    MxRotate(azimuth,'x',esphere->M);
                    MxRotate(pitch  ,'y',tempmatrix);
                    MxMultiply(esphere->M,tempmatrix,esphere->M);
                    MxRotate(roll   ,'z',tempmatrix);
                    MxMultiply(esphere->M,tempmatrix,esphere->M);

esphere->center[3] = 1.;
                    esphere->mptr = 0;
                    esphere->reflectiondispersion = 0;
                    esphere->transmissiondispersion = 0;
                    esphere++;
                    }
                }
                break;
        case 'h':
                {
                int spherenumber;
                double starttime;
                if(scanf("%d%lf%lf%lf%lf",
                        &spherenumber,&starttime,
                        &abc[0],&abc[1],&abc[2]) != 5)
                        fprintf(stderr, "Invalid hit\n");           ...remain
                else
                    {
                    struct movement *oldmptr, *newmptr;
                    double v;
                    abc[3] = 1.;
                    newptr = (struct movement *) malloc(sizeof(struct movement));
                    if (oldmptr = sphere[spherenumber].mptr)
                        {
                        while (oldmptr->mptr) oldmptr = oldmptr->mptr;
                        oldmptr->mptr = newmptr;
                        }
```

```
                            else
                                    sphere[spherenumber].mptr = newmptr;

newmptr->mptr = 0;
                            newmptr->starttime = starttime;
                            VxCopy(abc,newmptr->translate);
```

/*
   abc is the translation vector for the moving sphere.
   Let us take a perpendicular vector to it in the same z plane
   and follow the formulas from page 256 of Newman & Sproull, #1
   for rotating about an arbitrary vector.
*/

```
                            {double temp; temp = abc[0]; abc[0] = abc[1]; abc[1] = -temp;}

VxNormalize(abc,abc);
                                    v = sqrt((double)(abc[1]*abc[1] + abc[2]*abc[2]));
                                    MxIdentity(MR1);
                                    MR1[1][1] =    MR1[2][2] = abc[2]/v ;
                                    MR1[2][1] = -(MR1[1][2] = abc[1]/v);
                                    MxIdentity(MR2);
                                    MR2[0][0] =    MR2[2][2] = v ;
                                    MR2[2][0] = -(MR2[0][2] = abc[0]);
                                    MxMultiply(MR1,MR2,newmptr->MR1MR2);
                                    MR1[2][1] = -MR1[2][1];
                                    MR1[1][2] = -MR1[1][2];
                                    MR2[2][0] = -MR2[2][0];
                                    MR2[0][2] = -MR2[0][2];
                                    MxMultiply(MR2,MR1,newmptr->IR2IR1);
                            }
                    }
                    break;
            case 'l':
                    if(scanf(" %lf %lf %lf %lf %lf %lf %lf %lf %lf",
                            &elight->location0[0], &elight->location0[1], &elight->location0[2],
                            &elight->intensity0,
                            &elight->location1[0], &elight->location1[1], &elight->location1[2],
                            &elight->intensity1,
                            &elight->radius) != 9)
                                    fprintf(stderr, "Invalid light\n");
                            else
                                    {
                                    elight->location0[3] = 1.;
                                    elight->location1[3] = 1.;
                                    elight->rgb.red =
                                    elight->rgb.grn =
                                    elight->rgb.blu =
                                    elight->rgb.alf = 1.;
                                    elight++;
                                    }
                            break;
            case 'p':
                    {double dummy;                                                              ...remain if(scanf(" %lf %lf %lf %lf",&dummy,&dummy,&dummy,&dummy) != 4)
                            fprintf(stderr, "Invalid plane\n");
                    }
                    break;
            case 'm':
                    halfstripewidth = halfringwidth = linethickness = 0;
                    ringradius = 1.01;
                    break;
            case 'c':
                    if(scanf("%lf",&Fn) != 1)
                            fprintf(stderr, "Invalid camera lens\n");
                    break;
            case 'b':
                    if(scanf("%d",&dmz) != 1)
                            fprintf(stderr, "Invalid border\n");
                    break;
            default:
                    fprintf(stderr, "Unrecognized command ");
                    do
                            {
                            putc(c, stderr);
                            c=getchar();
                            }
                    while (c != EOF && c != '\n');
                    putc('\n', stderr);
            }
    printf("%d spheres, %d lights\n", esphere-sphere, elight-light);
```
/*
    for (lptr = light; lptr != elight; lptr++)
            {
            VxNormalize(lptr->location0,lptr->location0);
            VxNormalize(lptr->location1,lptr->location1);
            }
*/
```
    allocatecolorlinebuffers();
    if (debug)
            {
```

```
          fprintf(stderr,"pps    = %3d\n",pps);
          fprintf(stderr,"(ppfx,ppfy) = (%3d,%3d)\n",ppfx,ppfy);
          fprintf(stderr,"(spfx,spfy) = (%3d,%3d)\n",spfx,spfy);
          }

/*oldway
          CvuCamera(viewpoint,focuspoint,uppoint,0.);
*/
          CvuCamera(dblviewpoint,dblviewdirection,dblupdirection,0.);

CvuPerspective(fieldofview,1.333333,0.1,5.0);
          CvuGetN(normalizer);
          MxInvert(normalizer,inversenormalizer);
CvuViewPrint();
/*
          CvuSetScreenWindow(spfx-1.,0.,spfy-1.,0.,255.,0.);
*/
          CvuSetScreenWindow(0.,spfx-1.,0.,spfy-1.,0.,255.);
          {
          struct sphere *sptr;
          matrix N,P,S,T;
          CvuGetN(N);

CvuGetP(P);

CvuGetS(S);                                                              ...remain for (sptr = sphere; sptr != esphere; sptr++)
          {
          vector center;
          struct window w0,w1;
          FindCenter(sptr,t0,center);
          MxTranslate((double)center[0],
                      (double)center[1],
                      (double)center[2],T);
          MxMultiply(T,N,T);
          MxMultiply(T,P,T);
          MxMultiply(T,S,T);
          boundsphere(sptr->radius,T,&w0);

FindCenter(sptr,t1,center);
          MxTranslate((double)center[0],
                      (double)center[1],
                      (double)center[2],T);
          MxMultiply(T,N,T);
          MxMultiply(T,P,T);
          MxMultiply(T,S,T);
          boundsphere(sptr->radius,T,&w1);

if (w0.minx > w1.minx) w0.minx = w1.minx;
          if (w0.miny > w1.miny) w0.miny = w1.miny;
          if (w0.maxx < w1.maxx) w0.maxx = w1.maxx;
          if (w0.maxy < w1.maxy) w0.maxy = w1.maxy;

{
                    double duration;
                    struct movement *mptr;

VxCopy(sptr->center,center);
                    if (mptr = sptr->mptr)
                         {
                         while (mptr->mptr)
                              {
                              if ((t0 < mptr->starttime) && (t1 > mptr->starttime))
                                   {
                                   MxTranslate((double)center[0],
                                               (double)center[1],
                                               (double)center[2],T);
                                   MxMultiply(T,N,T);
                                   MxMultiply(T,P,T);
                                   MxMultiply(T,S,T);
                                   boundsphere(sptr->radius,T,&w1);

if (w0.minx > w1.minx) w0.minx = w1.minx;
                                   if (w0.miny > w1.miny) w0.miny = w1.miny;
                                   if (w0.maxx < w1.maxx) w0.maxx = w1.maxx;
                                   if (w0.maxy < w1.maxy) w0.maxy = w1.maxy;
                                   }
                              duration = mptr->mptr->starttime - mptr->starttime;
                              VxAddLerp(duration,center,mptr->translate,center);
                              mptr = mptr->mptr;
                              }
                         if ((t0 < mptr->starttime) && (t1 > mptr->starttime))
                              {
                              MxTranslate((double)center[0],
                                          (double)center[1],
                                          (double)center[2],T);
                              MxMultiply(T,N,T);
                              MxMultiply(T,P,T);
                              MxMultiply(T,S,T);
```

...remain

```
                                boundsphere(sptr->radius,T,&w1);

if (w0.minx > w1.minx) w0.minx = w1.minx;
                                if (w0.miny > w1.miny) w0.miny = w1.miny;
                                if (w0.maxx < w1.maxx) w0.maxx = w1.maxx;
                                if (w0.maxy < w1.maxy) w0.maxy = w1.maxy;
                                }
                        } sptr->w = w0;
printf("%d:%d,%d,%d,%d\n",sptr,sptr->w.minx,sptr->w.maxx,sptr->w.miny,sptr->w.maxy);
/* Concatenate all of the current matrices that affect the sphere.
 * Let T be the concatenated matrix that transforms the sphere from
 * model space to object space (cms) to eye space (Nsubl) to screen
 * space (NrPS).
 */
                }
        } for (sy = ystart-1; sy <= yend+1; sy++)
                {
                if (debug)
                        {fprintf(stderr,"    ,%3d\r",sy);fflush(stdout);}
                cyclecolorlinebuffers();
                if (yactivespheres(sy))
                for (sx = 0; sx < spfx; sx++)
                        if (xyactivespheres(sx,sy))
                        {
                        int ss;
                        int timeoffset;
                        if (debug)
                                {fprintf(stderr,"%3d\r",sx);fflush(stdout);}
                        timeoffset = sx*6 + sy*3;
                        for (ss = 0; ss < SS; ss++)
                                {
                                pixel[ss]=eyetrace(
                                 2*(sx+Location[ss].x+drand()/SS)/spfx - 1,
                                 1 - 2*(sy+Location[ss].y+drand()/SS)/spfy,
                                 t0 + (t1-t0)*(Times[(ss+timeoffset)%SS]+drand()/SS));
                                }
                        accumulateSS(pixel,sx*pps);
                        }
                if ((sy != ystart-1) && (sy != yend+1))
                        writecolorlinebuffers();

}
        if (!picPostEncodeScanline(picfile))
                printf("sphere: trouble writing tile in %s\n", argv[1]);
        PicClose(picfile);
        }

RGBAPixelType *RGBAline;

struct color **colorlineptr;
writecolorlinebuffers()                                                 writecolorlinebuffers
        {
        int i;
        for (i = 0; i < pps; i++)
                {
                converttoRGBAline(colorlineptr[i]+2);
                picEncodeScanline(picfile,RGBAline);
                }
        }
allocatecolorlinebuffers()                                              allocatecolorlinebuffers
```

...allocatecolorlinebuffers

```
        {
        int i;
        RGBAline = (RGBAPixelType *)malloc((unsigned)sizeof(RGBAPixelType)*ppfx);
        colorlineptr = (struct color **)malloc((unsigned)sizeof(struct color *)*(pps+2));
        for (i = 0; i < pps+2; i++)
                colorlineptr[i] = (struct color *)malloc((unsigned)sizeof(struct color)*(pps*spfx+2));
        }
cyclecolorlinebuffers()                                                 cyclecolorlinebuffers
        {
        int i,j;
        struct color *temp0, *temp1;
        struct color *colorptr;

temp0 = colorlineptr[pps];
        temp1 = colorlineptr[pps+1];
        for (i = pps+1; i >= 2; i--)
                {
                colorptr = colorlineptr[i] = colorlineptr[i-2];
                for (j = pps*spfx+2; j > 0; j--)
                        *colorptr++ = nullcolor;
                }
        colorlineptr[0] = temp0;
        colorlineptr[1] = temp1;
        }
```

```
converttoRGBAline(colorlineptr)                                          converttoRGBAline
struct color *colorlineptr;
        {
        RGBAPixelType *RGBAlineptr;
        int x;
        for (x = 0,RGBAlineptr = RGBAline; x < ppfx; x++,RGBAlineptr++,colorlineptr++)
                {
                RGBAlineptr->Red   =pv12(colorlineptr->red);
                RGBAlineptr->Green =pv12(colorlineptr->grn);
                RGBAlineptr->Blue  =pv12(colorlineptr->blu);
                RGBAlineptr->Alpha =pv12(colorlineptr->alf);
                }
        }
xyactivespheres(sx,sy)                                                   xyactivespheres
        {
        struct sphere *p;
        int flag;
        flag = 0;
        for(p=sphere;p != esphere;p++)
                {
                flag |=
                p->active =
                        (((sx >= p->w.minx-dms) && (sx <= p->w.maxx+dms)) &&
                         ((sy >= p->w.miny-dms) && (sy <= p->w.maxy+dms)));
/*printf(" %d:%d\n",p,p->active);*/
                }
        return(flag);
        }
yactivespheres(sy)                                                       yactivespheres
        {
        struct sphere *p;
        int flag;
        flag = 0;
        for(p=sphere;p != esphere;p++)
                {
                flag |=
                p->active = ((sy >= p->w.miny-dms) && (sy <= p->w.maxy+dms));

...yactivespheres
/*printf(" %d:%d\n",p,p->active);*/
                }
        return(flag);
/*
        The active flag indicates that the sphere touches this scanline.
        This can be answered by intersecting the plane determined by the
        point of view with the scanline with the sphere.  Actually, of
        course, the plane is 3d, one scanline high; the sphere is 4d,
        moving as it does through time.
        A simple approximation to reduce the plane back down to 2d is
        to intersect it with a sphere larger in radius by one extra
        scanline.
        Furthermore, the moving sphere can be neglected by using the
        average of the two sphere centers, with a radius increased by
        half the difference.
*/
        } accumulateSS(pSSptr,x)                                                   accumulateSS
struct color *pSSptr;
        {
        int ss;
        int i,j,k,l,m;
        float *fptr;
        float f;
        struct color *colorptr;

ss = 0;
        for (j = 0; j < pps; j++)
                {
                for (i = 0; i < pps; i++)
                        {
                        for (k = rpp; k > 0; k--)
                                {
                                int xoffset,yoffset;
                                fptr = &Filter[ssize][ss][0][0];
                                xoffset = Location[ss].x *pps;
                                yoffset = Location[ss].y *pps;
                                for (m = 0; m < 3; m++)
                                        {
```

```
                    colorptr = colorlineptr[yoffset+m]+xoffset+x;
                    for (l = 0; l < 3; l++)
                        {
                        f = *ptr++;
                        colorptr->red  += pSSptr->red *f;
                        colorptr->grn  += pSSptr->grn *f;
                        colorptr->blu  += pSSptr->blu *f;
                        colorptr->alf  += pSSptr->alf *f;
                        colorptr++;
                        }
                    }
                pSSptr++; ss++;
                }
            }
        }
    }
main(argc, argv)                                                        main
char *argv[];
    {
    argc = do_aargs(cmd.argc,argv);
    if (aa_helpflag) exit(0);
    if (argc < 2)
            {printf("Usage: gt filename\n");exit(1);} remain(argc, argv);                                                ...main
    }
```

1. Apparatus for the subtidal, cultchless cultivation of marine bivalve mollusks that comprises:
 a plurality of individual quadrilateral, compartments connected together in the form of a continuous belt, each compartment formed by an upper and a lower section of mesh fabric defined by substantially parallel longitudinal edges and substantially parallel transverse edges,
 said sections being releasably held together at said longitudinal edges and permanently at said transverse edges thereof leaving the remainder of said sections unconnected defining therebetween a mollusk culture chamber,
 said belt including:
 a pair of longitudinal cords, and
 a plurality of tubular members spaced apart along and normal to the longitudinal axes of said cords holding said cords spaced apart and substantially parallel to each other,
 said sections of mesh fabric being releasably closed and clamped at their said longitudinal edges to said cords.

2. The apparatus of claim 1 wherein said sections of mesh fabric are releasably closed and clamped to said cords by C-shaped tubular clamps.

3. The apparatus of claim 1 which comprises means to lift limited size portions of said belt out of the water in said aquaculture plot while leaving the remainder of said belt immersed in said water.

4. The apparatus of claim 3 wherein said means to lift comprises a floating platform.

5. The apparatus of claim 4 wherein said platform forms part of a person transport vessel.

6. Apparatus for the subtidal, cultchless cultivation of marine bivalve mollusks that comprises:
 a plurality of individual quadrilateral, compartments connected together in the form of a continuous belt, each compartment formed by an upper and a lower section of mesh fabric defined by substantially parallel longitudinal edges and substantially parallel transverse edges,
 said sections being held together at said longitudinal and transverse edges thereof leaving the remainder of said sections unconnected defining therebetween a mollusk culture chamber,
 said belt including:
 a pair of elongated cords,
 a plurality of tubular members spaced apart along and normal to the longitudinal axes of said cords holding said cords spaced apart and substantially parallel to each other,
 said sections of mesh fabric being releasably clamped at their said longitudinal edges to said cords by C-shaped tubular clamps and having their transverse edges joined together,
 said tubular members having a small section of tubing with a ID slightly larger than the diameter of said cords fixed thereto transversely at each end to serve as guideways for said cords and
 means to tether said belt in an aquaculture plot.

7. The apparatus of claim 6 wherein said means to tether consists of a bridle formed by splicing the ends of said cords at an end of said belt to a single line and a spacer member holding said cords spaced apart positioned between said splice and said end of said belt.

8. Apparatus for the subtidal, cultchless cultivation of marine bivalve mollusks that comprises:
 a plurality of individual quadrilateral, compartments connected together in the form of a continuous belt, each compartment formed by an upper and a lower section of mesh fabric defined by substantially parallel longitudinal edges and substantially parallel transverse edges,
 said sections being releasably held together at said longitudinal and permanently at said transverse edges leaving the remainder of said sections unconnected defining therebetween a mollusk culture chamber,
 said belt including:
 a pair of longitudinal cords,
 a plurality of tubular members spaced apart along and normal to the longitudinal axes of said cords holding said cords spaced apart and substantially parallel to each other, said sections of mesh fabric being releasably clamped at their said longitudinal edges to said cords, and means to left limited size portions of said belt out of the water while leaving the remainder of said belt immersed in said water comprising a power driven cylinder rotating about an horizontal axis positioned so that a portion of said cylinder projects above the level of said water.

9. The apparatus of claim 8 wherein said cylinder is mounted in a structure supported on pilings in an aquaculture plot.

10. Apparatus for the subtidal, cultchless cultivation of marine bivalve mollusks that comprises:

a plurality of individual quadrilateral, trays connected together in the form of a continuous belt, each tray being defined by substantially parallel longitudinal edges and substantially parallel transverse edges, said belt including:

a pair of longitudinal cords, a plurality of tubular members spaced apart along and normal to the longitudinal axes of said cords holding said cords spaced apart and substantially parallel to each other, said trays being held together at edges thereof by said pair of longitudinal cords, and means to lift limited size portions of said belt out of the water while leaving the remainder of said belt immersed in said water.

11. A method for the subtidal, cultchless cultivation of marine bivalve mollusks that comprises:

providing a plurality of individual quadrilateral compartments connected together in the form of a continuous belt, each compartment formed by an upper and a lower section of mesh fabric defined by substantially parallel longitudinal edges and substantially parallel transverse edges, said sections being held together releasably at said longitudinal edges and permanently at said transverse edges thereof leaving the remainder of said sections unconnected defining therebetween a mollusk culture chamber, placing juvenile mollusk in said culture chambers of said belt, immersing said belt in a subtidal aquaculture plot, allowing said juvenile mollusk to grow in said chambers, withdrawing portions of said belt out of the water at said aquaculture plot while allowing the remainder of said belt to remain immersed in said water, opening said compartments in said withdrawn portion of said belt at said longitudinal edges to process mollusks contained in said compartments and thereafter returning said withdrawn portion of said belt to said subtidal aquaculture plot.

12. The method of claim 11 wherein said withdrawing portions of said belt out of said water is accomplished by the use of a floating platform.

13. The method of claim 11 wherein said withdrawing portions of said belt out of the water is accomplished by passing said belt over a cylinder partially immersed in the water in said aquaculture plot.

* * * * *

UNITED STATES PATENT AND TRADEMARK OFFICE
CERTIFICATE OF CORRECTION

PATENT NO. : 4,896,626

DATED : Jan. 30, 1990

INVENTOR(S) : John K. Holt et al.

It is certified that error appears in the above-identified patent and that said Letters Patent is hereby corrected as shown below:

Delete entirely the small font text beginning with "APPENDIX A" spanning columns 5 & 6 below line 27 and terminating above line 28 at columns 73 & 74.

Signed and Sealed this

Twelfth Day of February, 1991

Attest:

HARRY F. MANBECK, JR.

Attesting Officer

Commissioner of Patents and Trademarks